US012230437B2

(12) United States Patent
Reese et al.

(10) Patent No.: US 12,230,437 B2
(45) Date of Patent: Feb. 18, 2025

(54) FREEZE-CAST MAGNETIC FLAKE COMPOSITES

(71) Applicant: Trustees of Dartmouth College, Hanover, NH (US)

(72) Inventors: Bradley A. Reese, Boylston, MA (US); Ulrike G. K. Wegst, Hanover, NH (US); Charles R. Sullivan, Hanover, NH (US)

(73) Assignee: Trustees of Dartmouth College, Hanover, NH (US)

( * ) Notice: Subject to any disclaimer, the term of this patent is extended or adjusted under 35 U.S.C. 154(b) by 0 days.

(21) Appl. No.: 18/137,051

(22) Filed: Apr. 20, 2023

(65) Prior Publication Data

US 2023/0352237 A1 Nov. 2, 2023

Related U.S. Application Data

(63) Continuation of application No. 16/855,938, filed on Apr. 22, 2020, now abandoned.

(Continued)

(51) Int. Cl.
*H01F 41/02* (2006.01)
*B22F 1/068* (2022.01)
(Continued)

(52) U.S. Cl.
CPC .......... *H01F 41/0206* (2013.01); *B22F 3/003* (2013.01); *B22F 3/222* (2013.01);
(Continued)

(58) Field of Classification Search
CPC .... H01F 41/0206; H01F 7/0278; B22F 3/003; B22F 3/222; B22F 1/068; B22F 1/10
See application file for complete search history.

(56) References Cited

U.S. PATENT DOCUMENTS 3,255,052 A 6/1966 Opitz
8,877,498 B2 11/2014 Wegst et al.
(Continued)

OTHER PUBLICATIONS

Divakar et al.; Anisotropic Freeze-Cast Collagen Scaffolds for Tissue Regeneration: How Processing Conditions Affect Structure and Properties in the Dry and Fully Hydrated States; J Mech Behav Biomed Mater. Feb. 2019; 90: 350-364. doi:10_1016/i.imbbm_2018.09_012.

(Continued)

*Primary Examiner* — Ricardo D Morales
(74) *Attorney, Agent, or Firm* — Hamilton, Brook, Smith & Reynolds, P.C.

(57) ABSTRACT

In an embodiment, the present disclosure pertains to a method of making a composite. In some embodiments, the method includes applying an external magnetic field to a mixture composed of a plurality of magnetic materials in a container, in which the external magnetic field produces a homogenous and uniform magnetic flux in the container. In some embodiments, the method further includes solidifying the mixture to result in the growth of solvent crystals in the mixture, and subliming a solvent phase of the mixture in the container to thereby form a composite having uniformly aligned magnetic materials. In an additional embodiment, the present disclosure pertains to a composite having uniformly aligned magnetic materials. In some embodiments, a majority of the magnetic materials in the composite are aligned in the same direction.

20 Claims, 22 Drawing Sheets

Related U.S. Application Data

(60) Provisional application No. 62/837,071, filed on Apr. 22, 2019.

(51) Int. Cl.
*B22F 1/10* (2022.01)
*B22F 3/00* (2021.01)
*B22F 3/22* (2006.01)
*H01F 7/02* (2006.01)

(52) U.S. Cl.
CPC ............ *H01F 7/0278* (2013.01); *B22F 1/068* (2022.01); *B22F 1/10* (2022.01)

(56) References Cited

U.S. PATENT DOCUMENTS

| | | | |
|---|---|---|---|
| 10,293,521 B2 | 5/2019 | Bai et al. | |
| 10,315,246 B2 | 6/2019 | Wegst et al. | |
| 2009/0039995 A1 | 2/2009 | Kipp et al. | |
| 2017/0100857 A1 | 4/2017 | Bai et al. | |
| 2017/0196237 A1 | 7/2017 | Wegst | |
| 2018/0153734 A1 | 6/2018 | Wegst et al. | |
| 2020/0331067 A1 | 10/2020 | Reese et al. | |
| 2021/0121956 A1* | 4/2021 | Lambert | B22F 3/222 |

OTHER PUBLICATIONS

Final Rejection Mailed on Oct. 21, 2022 for U.S. Appl. No. 16/855,938, 11 page(s).
Frank et al.; Synergistic structures from magnetic freeze casting with surface magnetized alumina particles and platelets; Journal of the Mechanical Behavior of Biomedical Materials 76 (2017) 153-163.
Nelson, et al.; Freeze casting of iron oxide subject to a tri-axial nested Helmholtz-coils driven uniform magnetic field for tailored porous scaffolds; Acta Materialia 173 (2019) 106-116.
Nelson, et al.; Helical and Bouligand Porous Scaffolds Fabricated by Dynamic Low Strenath Maanetic Field Freeze Castina; JOM, vol. 72, No. 4, 2020.
Niksiar, et al.; External Field Assisted Freeze Casting; Ceramics 2019, 2, 18.
Niksiar, et al.; Microstructural evolution of paramagnetic materials by magnetic freeze casting; J Mater Res Technol. 2019 8(2):2247-2254.
Non-Final Rejection Mailed on May 25, 2022 for U.S. Appl. No. 16/855,938, 11 page(s).
Porter et al.; Magnetic freeze casting inspired by nature; Materials Science & Engineering A 556 (2012) 741-750.
Reese, Bradley Alan. (2019). Alternative Winding and Magnetic Core Fabrication Methods for High Frequency Magnetic Components [Unpublished doctoral thesis]. Dartmouth College.
Caruso et al., "Tensile properties of freeze-cast collagen scaffolds: How processing conditions affect structure and performance in the dry and fully hydrated states," Journal of the Mechanical Behavior of Biomedical Materials, vol. 144, Aug. 2023, 105897, pp. 16.
Divakar et al., "Design, Manufacture, and in vivo Testing of a Tissue Scaffold for Permanent Female Sterilization by Tubal Occlusion," MRS Adv, vol. 3, 2018, pp. 1685-1690.
Divakar et al., "Quantitative evaluation of the in vivo biocompatibility and performance of freeze-cast tissue scaffolds," Biomed Mater, vol. 15, 055003, 2020, pp. 17.
Divakar et al., "Values and property charts for anisotropic freeze-cast collagen scaffolds for tissue regeneration," Data Brief, vol. 22, 2019, pp. 502-507.
Francis et al., "An ice-templated, linearly aligned chitosan-alginate scaffold for neural tissue engineering," Journal of Biomedical Materials Research Part A, vol. 101, 2013, pp. 3493-3503.
Francis et al., "Strategies for neurotrophin-3 and chondroitinase ABC release from freeze-cast chitosan-alginate nerve-guidance scaffolds," J Tissue Eng Regen Med, vol. 11, 2017, pp. 285-294.
Mohan et al., "Fluorescent Reporter Mice for Nerve Guidance Conduit Assessment: A High-Throughput in vivo Model," Laryngoscope, vol. 128, 2018, pp. E386-E392.
Riblett et al., "Ice-Templated Scaffolds with Microridged Pores Direct DRG Neurite Growth," Advanced Functional Materials, vol. 22, 2012, pp. 4920-4923.
Yin et al., "2D and 3D graphical datasets for bamboo-inspired tubular scaffolds with functional gradients: micrographs and tomograms," Data Brief, vol. 31, 105870, 2020, pp. 9.
Yin et al., "Bamboo-inspired tubular scaffolds with functional gradients," J Mech Behav Biomed Mater, vol. 110, 103826, 2020, pp. 10.
Yin et al., "Freeze-cast Porous Chitosan Conduit for Peripheral Nerve Repair," MRS Advances, vol. 3, 2018, pp. 1677-1683.
Yin et al., "Freeze-casting porous chitosan ureteral stents for improved drainage," Acta Biomater, vol. 84, 2019, pp. 231-241.
Yin et al., "Plant-Derived Nanocellulose as Structural and Mechanical Reinforcement of Freeze-Cast Chitosan Scaffolds for Biomedical Applications," Biomacromolecules, vol. 20, 2019, pp. 3733-3745.
Yin et al., "Structure-property-processing correlations of longitudinal freeze-cast chitosan scaffolds for biomedical applications," J Mech Behav Biomed Mater, vol. 121, 104589, 2021, pp. 13.

* cited by examiner

Magnetic Fixture

FREEZE-CAST MAGNETIC FLAKE COMPOSITES

CROSS-REFERENCE TO RELATED APPLICATIONS

This application claims priority to U.S. patent application Ser. No. 16/855,938, filed on Apr. 22, 2020, which claims priority to U.S. Provisional Patent Application No. 62/837,071, filed on Apr. 22, 2019. The entirety of each of the aforementioned applications is incorporated herein by reference.

STATEMENT REGARDING FEDERALLY SPONSORED RESEARCH

This invention was made with government support under 1538094 and 1822140 awarded by the National Science Foundation. The government has certain rights in the invention.

BACKGROUND

Various methods, for example, freeze-casting methods in a magnetic field, have been previously used to form magnetic composite materials. However, a drawback of these methods is that non-homogeneous and non-uniform magnetic fluxes are utilized for particle alignment, thereby resulting in the formation of inhomogeneous composites with non-uniformly aligned composites. Additionally, many of the particles utilized are not magnetic themselves but only surface magnetized, which further affects the quality of composites. Various embodiments of the present disclosure address the aforementioned limitations.

SUMMARY

In an embodiment, the present disclosure pertains to a method of making a composite. In some embodiments, the method includes applying an external magnetic field to a mixture composed of a plurality of magnetic materials in a container, in which the external magnetic field produces a homogenous and uniform magnetic flux in the container. In some embodiments, the method further includes solidifying the mixture to result in the growth of solvent crystals in the mixture, and subliming a solvent phase of the mixture in the container to thereby form a composite having uniformly aligned magnetic materials.

In an additional embodiment, the present disclosure pertains to a composite having uniformly aligned magnetic materials. In some embodiments, a majority of the magnetic materials in the composite are aligned in the same direction. Additional embodiments of the present disclosure relate to containers for forming the composites via the methods of the present disclosure.

DESCRIPTION OF THE DRAWINGS

FIG. 11 illustrates scanning electron micrographs of longitudinal (Long, FIG. 11A and FIG. 11C) and transverse (Trans, FIG. 11B and FIG. 11D) cross-section of the magnetic composites frozen with and without an externally applied magnetic field.

DETAILED DESCRIPTION

Figure 1A:
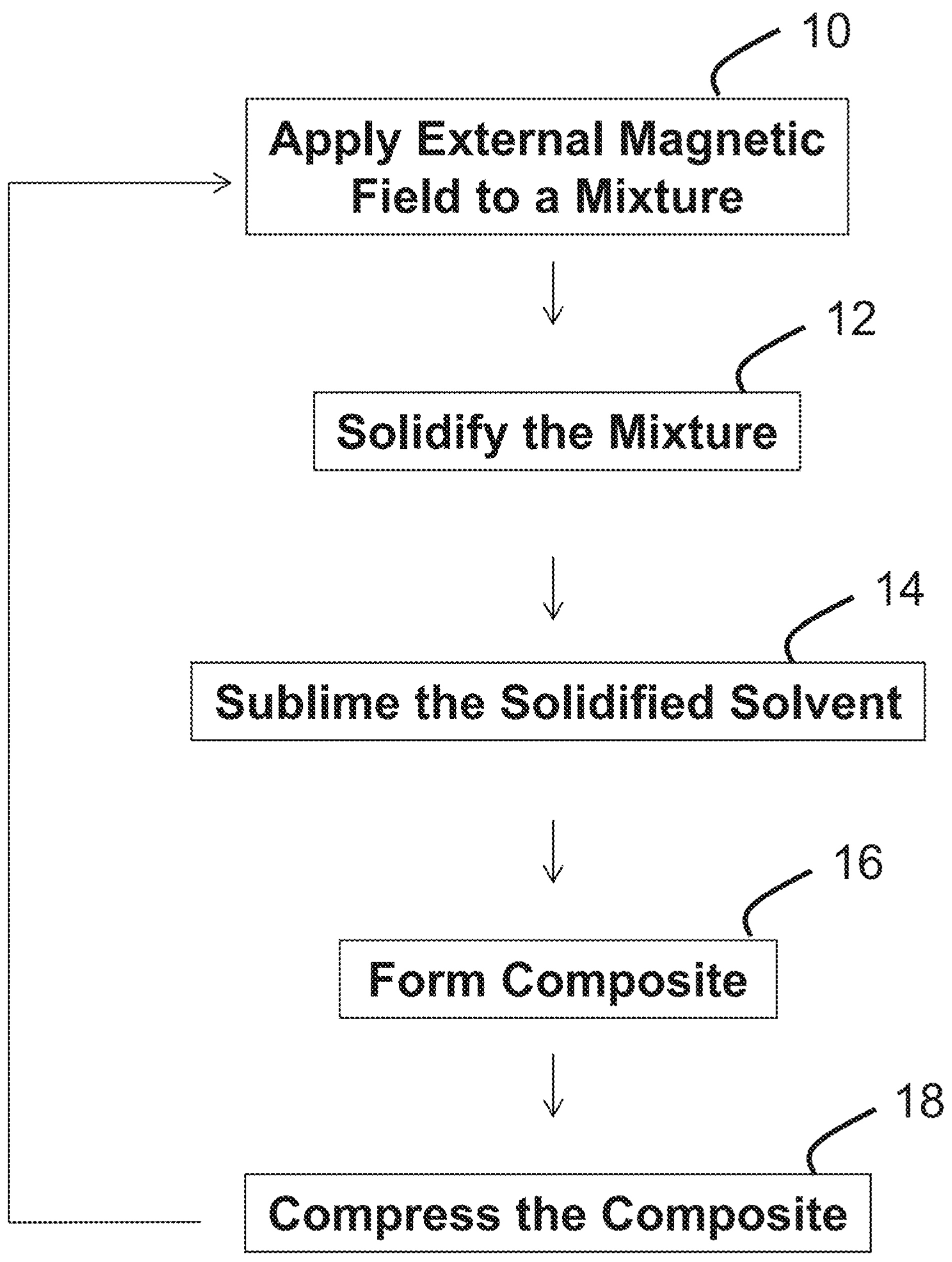
FIG. 1A illustrates a method of making a composite according to an aspect of the present disclosure.

It is to be understood that both the foregoing general description and the following detailed description are illustrative and explanatory, and are not restrictive of the subject matter, as claimed. In this application, the use of the singular includes the plural, the word “a” or “an” means “at least one”, and the use of “or” means “and/or”, unless specifically stated otherwise. Furthermore, the use of the term “including”, as well as other forms, such as “includes” and “included”, is not limiting. Also, terms such as “element” or “component” encompass both elements or components comprising one unit and elements or components that include more than one unit unless specifically stated otherwise.

The section headings used herein are for organizational purposes and are not to be construed as limiting the subject matter described. All documents, or portions of documents, cited in this application, including, but not limited to, patents, patent applications, articles, books, and treatises, are hereby expressly incorporated herein by reference in their entirety for any purpose. In the event that one or more of the incorporated literature and similar materials defines a term in a manner that contradicts the definition of that term in this application, this application controls.

Recent advances in power semiconductor devices allow for reduced size and power loss of power converters. A feature of these converters is the use of high switching frequencies to reduce the size and cost of capacitors and magnetic components (e.g., inductors and transformers). However, as the frequency increases, power losses in these components also tend to increase, thereby limiting the maximum operating frequency. This limitation can be extended for magnetic components with new winding and magnetic core technologies.

Magnetic core materials are also contributors to the power loss of magnetic components. While emerging thin-film magnetic materials offer significantly lower power losses than ferrites, they are very expensive to manufacture and difficult to scale up to higher power levels.

A common theme for reducing power loss in magnetic core materials is to interleave thin layers of magnetic material with thin layers of an electrical insulator. When a tier e varying magnetic flux passes through a conductor (including many magnetic materials), it generates eddy currents which lead to power loss. Thin laminations of magnetic material decrease the amount of flux passing through a conductive region, thus reducing the magnitude of induced eddy currents. Instead of continuous laminations, some cores are composed of small magnetic particles in an insulating binder.

Freeze-casting methods in a magnetic field have been previously used to form composite materials. However, a drawback of the current methods is that the position, not just the rotation of particles becomes affected. Moreover, previously utilized magnetic fixtures used for particle alignment produce a magnetic flux in a mold that is non-uniform and non-homogeneous, thereby resulting in both particle rotation and translation. In addition, methods to reduce inhomogeneity have been applied to spherical particles only.

Accordingly, a need exists for more effective systems and methods for aligning magnetic flakes in a composite material. Various embodiments of the present disclosure address the aforementioned need.

An embodiment of the present disclosure pertains to methods of making a composite. In some embodiments illustrated in FIG. 1A, the methods of the present disclosure include one or more of the following steps: applying an external magnetic field to a mixture composed of a plurality of magnetic materials in a container (step 10); solidifying the mixture in the container (step 12); subliming the solidified solvent (e.g., derived from a solvent phase of the mixture) in the container (step 14); and forming a composite (step 16). In some embodiments, the methods of the present disclosure also include a step of compressing the composite, such as through applying pressure to the composite (step 18). In some embodiments, the methods of the present disclosure can be repeated until a desired amount of the composite is formed. In some embodiments, the method is repeated after the composite is formed (step 16). In some embodiments, the method is repeated after compressing of the composite (step 18). In some embodiments, the solidifying can include, without limitation, freezing.

Figure 1B:
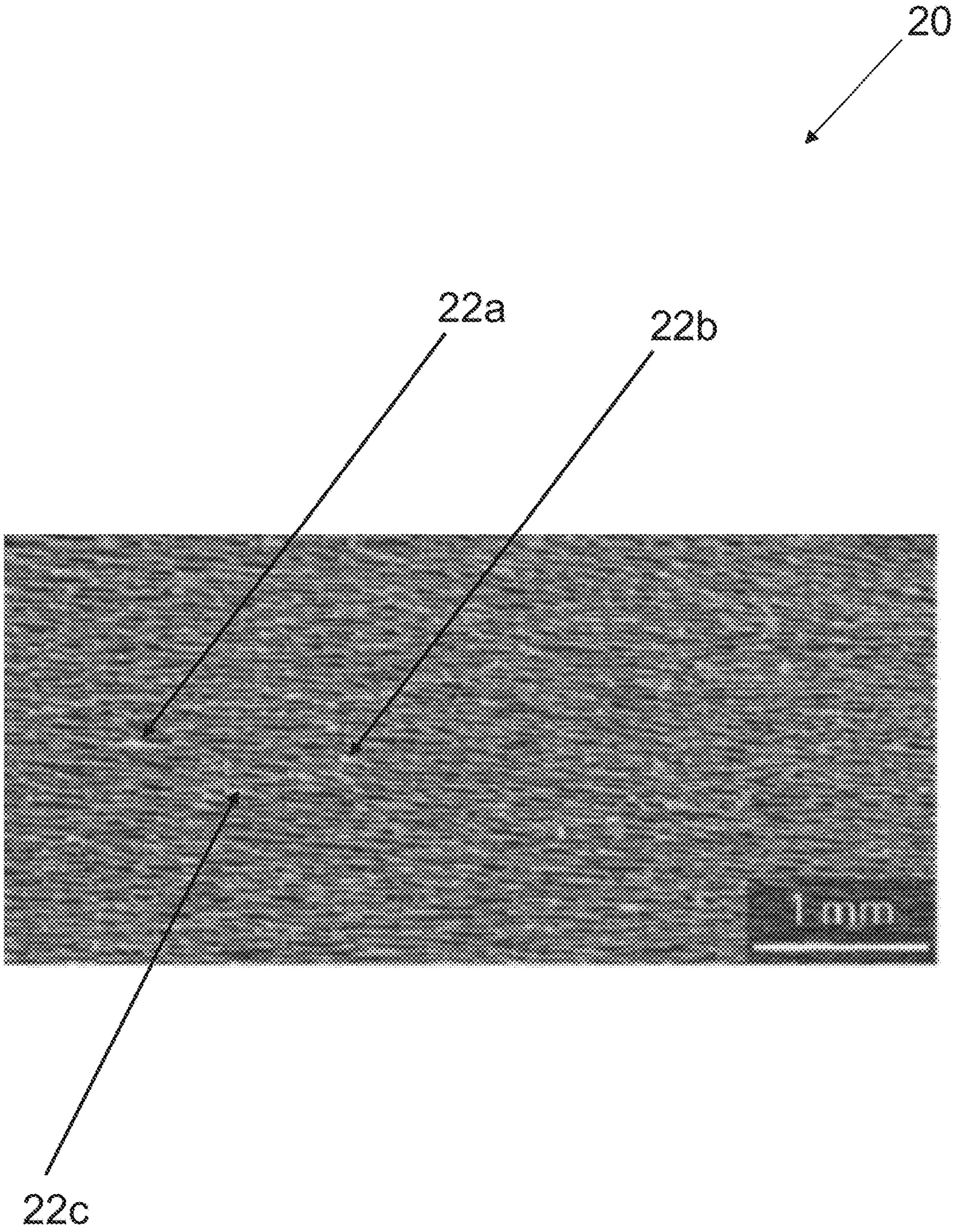
FIG. 1B depicts an image of a composite formed utilizing methods according to an aspect of the present disclosure.

Additional embodiments of the present disclosure pertain to composites that include magnetic materials. In some embodiments illustrated in FIG. 1B, the composites of the present disclosure can be in the form of composite 20. In some embodiments, composite 20 has a plurality magnetic materials (e.g., magnetic materials 22*a*, 22*b*, and 22*c*). As illustrated in FIG. 1B, the plurality of magnetic materials of composite 20 are homogeneously and uniformly aligned. In some embodiments, a majority of the plurality magnetic materials of composite 20 are aligned in the same direction, as also illustrated in FIG. 1B.

Further embodiments of the present disclosure pertain to containers that can be utilized for making the composites of the present disclosure. In some embodiments, the containers of the present disclosure include a square or rectangular shape and a bottom portion. In various embodiments, the containers of the present disclosure are also associated with one or more mold guides, a cooling mechanism, such as a coldfinger, and a magnetic field source for applying an external magnetic field to the container.

Figure 1C:
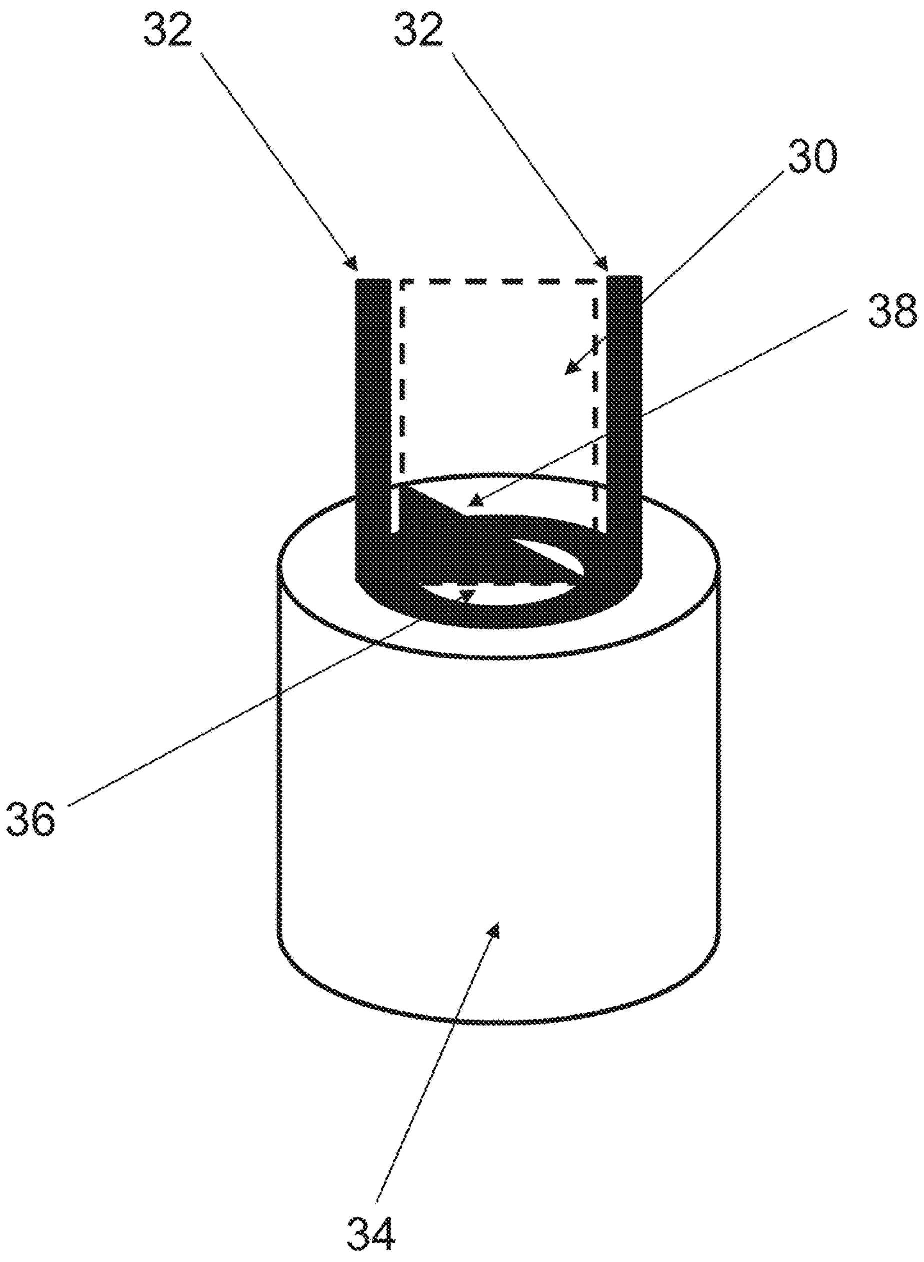
FIG. 1C depicts a container utilized in forming the composites utilizing methods according to an aspect of the present disclosure.

In some embodiments illustrated in FIG. 1C, the containers of the present disclosure are in the form of container 30. As depicted in FIG. 1C, container 30 is situated between mold guides 32, which are attached to a collar 34 to align container 30 with a coldfinger 36, and which are operable to hold a magnetic fixture (not shown) and/or samples (not shown).

As depicted in FIG. 1C, container 30 also has a bottom portion 38 with an inclination angle greater than 0°. As shown in FIG. 1C, the bottom portion 38 is in the form of a wedge to allow for generation of a dual temperature gradient. However, in some embodiments, the bottom portion 38 is flat.

As set forth in more detail herein, the methods, composites, and containers of the present disclosure can have numerous embodiments. For instance, the methods of the present disclosure can include various mixtures, magnetic materials, and binders. Moreover, various containers may be utilized to form the composites of the present disclosure.

Furthermore, various composites may be formed by utilizing the methods and containers of the present disclosure.

Methods of Making Composites

As set forth in more detail herein, the methods to form the composites of the present disclosure can include various steps and can utilize various mixtures, magnetic materials, binders, and dispersants. For example, the methods of the present disclosure generally include: (1) applying an external magnetic field to a mixture composed of a plurality of magnetic materials in a container; (2) solidifying the mixture in the container; and (3) subliming the solidified solvent (e.g., derived from a solvent phase of the mixture) in the container. In some embodiments, the solidifying step results in the solidification of a solvent in the mixture. In some embodiments, the solidifying is achieved through freezing methods.

Thereafter, a composite having uniformly aligned magnetic materials is formed. In some embodiments, the solidifying results in the growth of solvent crystals in the mixture. In some embodiments, the solvent crystals are ice crystals. In some embodiments, the solidifying can be utilized, at least indirectly, for removal of the solvent (or water) to form cell walls around the plurality of magnetic materials. In some embodiments, the cell walls are composed of residual materials in the mixture, including, but not limited to, binders (e.g., polymers). In some embodiments, the container has a bottom portion with an inclination angle greater than or equal to 0°.

Additionally, in some embodiments, the methods of the present disclosure further include (4) compressing the formed composite. In some embodiments, the compression is conducted by applying pressure to the formed composites.

Furthermore, the composites of the present disclosure can have various forms. Moreover, various containers can be utilized to form the composites according to the methods of the present disclosure. In addition, the methods, composites, and containers of the present disclosure may have various advantageous properties.

External Magnetic Fields

The methods of the present disclosure can include various steps and processes. For example, in some embodiments, the methods of the present disclosure include the step of applying a magnetic field a mixture composed of a plurality of magnetic materials. In some embodiments, the magnetic field is an external magnetic field. In some embodiments, applying the magnetic field to the container results in the formation of a composite having uniformly aligned magnetic materials.

In some embodiments, the application of the external magnetic field can be applied at various times during the methods disclosed herein. For instance, in some embodiments, the application of the external magnetic field occurs before the solidifying step. In some embodiments, the application of the external magnetic field occurs during the solidifying step. In some embodiments, the application of the external magnetic field occurs during the solidifying and sublimation steps. In some embodiments, the application of the external magnetic field controls the growth of solvent crystals in the mixture during the solidifying step. In some embodiments, the solvent crystals are ice crystals. In some embodiments, with higher magnetic fields, water in the mixture can be affected which can enhance the structural features of the composites disclosed herein.

Additionally, in some embodiments, the application of the external magnetic field produces a homogenous and uniform magnetic flux in a container. For instance, in some embodiments, the external magnetic field causes alignment of the magnetic materials disclosed herein. In some embodiments, the external magnetic field keeps the magnetic materials afloat in the mixture. In some embodiments, the external magnetic field acts against gravitational forces acting on the magnetic materials in the mixture. In some embodiments, the external magnetic field aligns magnetic materials (e.g., plates, flakes, and/or platelets) and/or cell walls (e.g., portions formed by removal of water and/or solvent upon solidification and/or sublimation of the mixture). In some embodiments, the external magnetic field forms uniform alignment of the magnetic materials.

In some embodiments, the external magnetic field can be applied perpendicular to a direction of solidification. In some embodiments, the external magnetic field can be applied parallel to a direction of solidification. In some embodiments, more than one magnetic flux direction can be utilized. For example, in some embodiments, a solidification direction can form in a first direction, a first magnetic field can cause a magnetic flux in a second direction, and a second magnetic field can cause a magnetic flux in a third direction. In some embodiments, the first, second, and third directions are parallel. In some embodiments, the first, second, and third directions are perpendicular. In some embodiments, each of the first, second, and third directions can be parallel or perpendicular to each other. For example, the first and second direction can be parallel and perpendicular to the third direction. In some embodiments, the solidification direction is a freeze direction.

Additionally, in some embodiments, the first and second directions can be perpendicular and the third direction parallel to one of the first or second directions. Varying combinations of magnetic flux directions and solidification directions are readily envisioned. In some embodiments, the external magnetic field is a multi-directional magnetic field. In some embodiments, the external magnetic field is applied in a biaxial magnetic field arrangement. In some embodiments, the external magnetic field is applied in a tri-axial magnetic field arrangement.

Additionally, in some embodiments, the step of applying the external magnetic field aligns the magnetic materials parallel to the magnetic flux from the applied external magnetic field. In some embodiments, a solidifying step results in the alignment of the magnetic materials parallel to the solidification direction and the external magnetic field aligns the magnetic materials parallel to the magnetic flux from the applied external magnetic field. In some embodiments, the solidification direction and the magnetic flux are parallel to one another. In some embodiments, the solidification direction and the magnetic flux are perpendicular to one another.

External magnetic fields can have various effects on magnetic materials. For instance, in some embodiments, the magnetic field rotates at least some of the magnetic materials (e.g., magnetic particles). In some embodiments, the magnetic field rotates at least some of the magnetic materials without significantly altering the position of the magnetic materials (e.g., magnetic particles). In some embodiments, the magnetic field rotates the magnetic materials around the external magnetic field. In some embodiments, the application of the external magnetic field rotates the magnetic materials without significantly changing their position. For example, in some embodiments, the external magnetic field causes magnetic materials, for example, magnetic flakes and/or plates, in the mixture to rotate and preferentially align with the external magnetic field. In some embodiments, the external magnetic field induces non-uniform magnetic fields in neighboring magnetic materials. In some embodiments, the non-uniform magnetic fields cause the magnetic materials to form head-to-tail chains. In some embodiments, the non-uniform magnetic field forces the magnetic materials apart from one another laterally to thereby form nacre-like packing. In some embodiments, the magnetic materials form in a nacre-like lamellae.

In some embodiments, the external magnetic field remains constant in a same direction. In some embodiments, the external magnetic field alternates between different directions. In some embodiments, the external magnetic field (and magnetic flux through the mixture) remain uniform with varying changes of permeability of a sample composed of the magnetic materials. In some embodiments, the external magnetic field forms mono-domain structures of the magnetic materials.

In some embodiments, the external magnetic field is generated by the use of soft magnetic materials and permanent magnets. For instance, in some embodiments, one or more soft magnetic materials in parallel arrangement can be utilized in combination with one or more permanent magnetics positioned between the one or more soft magnetic materials.

In some embodiments, the one or more soft magnetic materials facilitate the production of a homogenous and uniform magnetic flux. In some embodiments, the one or more soft magnetic materials provide a constant potential throughout a surface thereof to produce a homogenous and uniform magnetic flux. In some embodiments, the magnetic potential is constant in the one or more soft magnetic materials. In some embodiments, the one or more soft magnetic materials and the one or more permanent magnets have different magnetic potentials. In some embodiments, various combinations of magnetic potentials in both the soft magnetic materials and the permanent magnets produce a homogenous and uniform magnetic flux.

Mixtures

As set forth in more detail herein, the mixtures of the present disclosure can be in various forms, include various binders, dispersants, solvents, and particles, and can be composed of various magnetic materials. For instance, in some embodiments, the mixtures are in the form of a suspension. In some embodiments, the mixtures are in the form of a solution. In some embodiments, the mixtures are in a solvent.

In some embodiments, the solvent includes, without limitation, camphene, naphthalene-camphor, tert-butyl alcohol, cyclohexane, dioxane, dimethyl sulfoxide, water, and combinations thereof. In some embodiments, the solvent is water. In some embodiments, the mixtures are in the form of a water-based slurry.

Furthermore, the mixtures of the present disclosure can additionally include a binder. In some embodiments, the binder is an insulating binder. In some embodiments, the binder is an electrically insulating binder. In some embodiments, the binder is a thermally conducting binder. In some embodiments, the binder is a biopolymer. In some embodiments, the binder includes, without limitation, chitosan, gelatin, alginate, cellulose, and combinations thereof. In some embodiments, the binder is chitosan-gelatin binder. In some embodiments, the binder is a nano-structured cellulose, for example, a nanocellulose binder. In some embodiments, the nano-structured cellulose can be combined with the binders described herein. For example, in some embodiments, a nanocellulose binder can be combined with at least one of a polymer and/or a biopolymer. In some embodiments, the binder provides isolation between the magnetic materials.

In some embodiments, the binder is a polymer. In some embodiments, the polymer includes, without limitation, low-density polyethylene (LDPE), high-density polyethylene (HDPE), polypropylene (PP), polyvinyl chloride (PVC), polystyrene (PS), nylon, polytetrafluoroethylene, thermoplastic polyurethanes (TPU), polydimethylsiloxane (PDMS), polyethylene glycol (PEG), polyethylene oxide (PEO), polyvinyl alcohol (PVA), and combinations thereof. In some embodiments, the polymer includes, without limitation, polydimethylsiloxane (PDMS).

In some embodiments, the mixtures of the present disclosure further include dispersants. In some embodiments, the dispersants include, without limitation, a plasticizer, a superplasticizer, a non-surface active polymer, a surface-active polymer, a non-surface acting substance, a surface-active substance, a colloid, surfactants, surface coating dispersants, ionic dispersants, anionic dispersants, cationic dispersants, nonionic dispersants, and combinations thereof.

The mixtures of the present disclosure can be composed of various magnetic materials. For example, in some embodiments, the magnetic materials include, without limitation, ferromagnetic materials, paramagnetic materials, diamagnetic materials, Sendust flakes, and combinations thereof. In some embodiments, the magnetic materials include, without limitation, iron, nickel, cobalt, rare earth elements and their alloys, and combinations thereof. In some embodiments, the magnetic materials include, without limitation, $Fe_3O_4$. In some embodiments, the magnetic materials are Sendust flakes.

Additionally, the magnetic materials of the present disclosure can be in various forms. For example, in some embodiments, the magnetic materials can be in forms including, without limitation, magnetic flakes, magnetic platelets, magnetic particles, magnetic nanoparticles, magnetic nanowires, magnetic nanotubes, plates, magnetic plates, and combinations thereof. In some embodiments, the magnetic materials can be particles with a magnetic coating. In some embodiments, the magnetic materials are surface-magnetized materials. In some embodiments, the magnetic materials are magnetic particles with a non-magnetic coating.

In some embodiments, the magnetic materials are magnetic flakes. In some embodiments, the magnetic flakes have a thickness of about 0.1 to 1 microns. In some embodiments, the magnetic flakes have about half-micron thicknesses. In some embodiments, the magnetic flakes have a thickness of about 1 micron.

In some embodiments, the magnetic flakes have diameters of about 1 to 100 microns. In some embodiments, the magnetic flakes have diameters of about 2 to 50 microns. In some embodiments, the magnetic flakes have diameters of about 25 microns. In some embodiments, the magnetic flakes have diameters of about 50 microns. In some embodiments, the magnetic flakes have diameters of about 75 microns. In some embodiments, the magnetic flakes have diameters of about 100 microns.

In some embodiments, the magnetic flakes have a non-spherical shape. In some embodiments, the magnetic flakes have an amorphous shape. In some embodiments, the magnetic flakes have a non-symmetrical shape.

In some embodiments, the magnetic flakes are embedded in a binder. In some embodiments, the magnetic materials are in the form of magnetic platelets.

In some embodiments, the magnetic materials of the present disclosure are in the form of particles that include a surface and an internal core. In some embodiments, both the surface and the internal core are magnetic. In some embodiments, the particles are surface-magnetized. In some embodiments only the core is magnetic. In some embodiments only the surface is magnetic.

Containers

As set forth in more detail herein, the methods of the present disclosure can be conducted in containers with various shapes, forms, and bottom portions. For instance, in some embodiments, the containers of the present disclosure can be in a rectangular shape. In some embodiments, the containers can be in a square shape. In some embodiments, the containers can be in a non-round shape. In some embodiments, the shape represents a cross-section of the container.

In some embodiments, the containers of the present disclosure can be in the form of a mold. In some embodiments, containers of the present disclosure can be polymer-based. For example, in some embodiments, the containers of the present disclosure can contain a polymer including, but not limited to, poly(methyl methacrylate) (PMMA), polytetrafluoroethylene (PTFE), low-density polyethylene (LDPE), high-density polyethylene (HDPE), polypropylene (PP), polyvinyl chloride (PVC), polystyrene (PS), nylon, polytetrafluoroethylene, thermoplastic polyurethanes (TPU), polydimethylsiloxane (PDMS), polyethylene glycol (PEG), polyethylene oxide (PEO), and combinations thereof. In some embodiments, the polymer includes, without limitation, polydimethylsiloxane (PDMS).

As set forth in more detail herein, the containers of the present disclosure can include various bottom portions. For instance, in some embodiments, the bottom portion of the containers disclosed herein can be in the form of a wedge. In some embodiments, the bottom portion of the container can be flat.

In some embodiments, the bottom portion is straight and without an inclination angle (i.e. flat). In some embodiments, the bottom portion can have an inclination angle. In some embodiments, the inclination angle is less than 5°. In some embodiments, the inclination angle is greater than 5°. In some embodiments, the inclination angle is greater than 10°. In some embodiments, the inclination angle is greater than 20°. In some embodiments, the inclination angle is greater than 30°. In some embodiments, the inclination angle is greater than 40°. In some embodiments, the inclination angle is greater than 45°. In some embodiments, the inclination angle is between 5° to 55°.

In some embodiments, the bottom portion generates a temperature gradient. In some embodiments, the temperature gradient is generated across the mixture. In some embodiments, the temperature gradient is generated vertically across the mixture. In some embodiments, the temperature gradient allows for the formation of a mono-domain structure of the composite in which pores are aligned during solidification. In some embodiments, the temperature gradient is a dual temperature gradient. In some embodiments, a copper wedge bottom portion of a mold is filled with a polymer (e.g., PDMS) wedge to form a lateral thermal gradient. In some embodiments, a lateral thermal gradient is formed in addition to a longitudinal thermal gradient.

In some embodiments, the bottom portion can be composed of a metal. In some embodiments, the bottom portion can include a metal. In some embodiments, the bottom portion is metal. In some embodiments, the metal includes, without limitation, copper, nickel, cobalt, iron, iron oxides, transition metals, aluminum, and combinations thereof. In some embodiments, the metal is copper. In some embodiments, the bottom portions have a polished metal surface and/or coating. In some embodiments, the bottom portions have a reflective metal surface and/or coating. In some embodiments, the bottom portions have a surface pattern. In some embodiments, the surface patterns are uniform. In some embodiments, the surface patterns are non-uniform. In some embodiments, the surface pattern of the bottom portions can affect ice nucleation.

In some embodiments, the containers of the present disclosure can further include a mold guide. For example, in some embodiments, the containers can include a plurality of mold guides. In some embodiments, the plurality of mold guides can be utilized to hold a sample used to create a composite of the present disclosure in the center thereof.

In some embodiments, the containers of the present disclosure further include a cooling mechanism. In some embodiments, the cooling mechanism is a plurality of cooling mechanisms. In some embodiments, the cooling mechanism can be below a sample. In some embodiments, the cooling mechanism can be above the sample. In some embodiments, the cooling mechanism can be above and below the samples. In some embodiments, the cooling mechanism can be on either side, or both sides of the sample. In some embodiments, the cooling mechanism is at least one coldfinger. In some embodiments, the at least one coldfinger is positioned below the bottom portion of the container, above the sample, or on one or more sides of the sample. In some embodiments, the mold guide center the container over the cooling mechanism, for example, a coldfinger.

In some embodiments, the containers of the present disclosure also include a magnetic field source. In some embodiments, the magnetic field source is suitable for applying an external magnetic field to the container.

As set forth in more detail herein, various magnetic field sources may be associated with the containers of the present disclosure. For instance, in some embodiments, the magnetic field source includes one or more magnetic fields. In some embodiments, the magnetic field source includes one or more stationary magnetic fields. In some embodiments, the magnetic field source is in the form of an electromagnet. In some embodiments, the magnetic field source is in the form of a plurality of soft magnetic materials used in combination with permanent magnets. In some embodiments, the magnetic field source is in the form of a plurality of soft magnetic materials and at least one magnetic coil.

In some embodiments, the magnetic field source is utilized in the form of a magnetic fixture. In some embodiments, the magnetic fixture is appended to one or more mold guides of the containers of the present disclosure. In some embodiments, the magnetic fixture includes one or more magnets. In some embodiments, the magnetic fixture includes a plurality of magnets. In some embodiments, the magnetic fixture includes an electromagnetic fixture.

In some embodiments, the magnetic fixture includes one or more soft magnetic materials in parallel arrangement. In some embodiments, the one or more soft magnetic materials further includes one or more permanent magnets positioned between the one or more soft magnetic materials. In some embodiments, the one or more soft magnetic materials facilitate the production of a homogenous and uniform magnetic flux in the container. In some embodiments, the one or more permanent magnets can be coiled magnets.

Solidification

The methods of the present disclosure can also include the step of solidifying the mixture composed of the plurality of magnetic materials. In some embodiments, the solidifying step includes solidifying the solvent in the mixture. In some embodiments, the solidifying step includes solidifying water. In some embodiments, the solidifying occurs by exposure of the container to a cooling mechanism. In some embodiments, the exposure of the container to the cooling mechanism can be direct exposure. In some embodiments, the exposure of the container to the cooling mechanism can be indirect exposure. In some embodiments, the solidifying step results in the alignment of the magnetic materials parallel to the solidification direction. In some embodiments, the solidifying is achieved through freezing.

In some embodiments, the solidifying step results in the solidification of magnetic materials in a first direction that is different from the direction of the magnetic flux from the external magnetic field. For instance, in some embodiments, the first direction is perpendicular to the direction of the magnetic flux from the external magnetic field. In some embodiments, the first direction is perpendicular to the second direction. In some embodiments, the first direction is parallel to the second direction.

In some embodiments, the solidifying is conducted through a cooling mechanism, such as for example, a coldfinger. In some embodiments, the solidifying is conducted through a bottom-up freeze method. In some embodiments, the solidifying is conducted thought a top-down freeze method. In some embodiments, the solidifying is conducted through a bottom-up and top-down freeze method. In some embodiments, the solidifying is conducted though a doubled sided freeze method.

Subliming

The methods of the present disclosure can additionally include subliming the mixture in the container at various times and by various methods. For example, in some embodiments, the subliming occurs during the solidifying step. In some embodiments, the subliming occurs after the solidifying step.

In some embodiments, the subliming occurs by lyophilization. In some embodiments, the subliming removes solvent crystals formed during the solidifying step. In some embodiments, the solvent crystals are ice crystals. In some embodiments, the sublimation can occur with a sample demolded.

In some embodiments, the sublimation can occur with a sample in mold. In some embodiments, the sublimation can occur with a sample in mold, but without a mold bottom. In some embodiments, sublimation can occur with a sample in a mold bottom. In some embodiments, the subliming removes solvent crystals formed during the solidifying step, thereby forming cell walls around the magnetic particles. In some embodiments, the cell walls are composed of materials in the mixture, such as, for example, binders, polymers, dispersants, and combinations thereof.

Formed Composites

As set forth in more detail herein, the methods of the present disclosure can form various composites with various properties. Additional embodiments of the present disclosure pertain to the formed composites.

In some embodiments, the methods of the present disclosure form composites that include uniformly aligned magnetic materials, such as the magnetic materials described in detail above. In some embodiments, the formed composites further include a binder (e.g., a polymer), such as the binders discussed in detail above. In some embodiments, the formed composites further include dispersants, such as the dispersants discussed above.

In some embodiments, a majority of the magnetic materials in the composite are aligned in the same direction. In some embodiments, at least 60% of the magnetic materials in the composite are aligned in the same direction. In some embodiments, at least 70% of the magnetic materials in the composite are aligned in the same direction. In some embodiments, at least 80% of the magnetic materials in the composite are aligned in the same direction. In some embodiments, at least 90% of the magnetic materials in the composite are aligned in the same direction. In some embodiments, at least 95% of the magnetic materials in the composite are aligned in the same direction. In some embodiments, at least 99% of the magnetic materials in the composite are aligned in the same direction.

In addition, the composites of the present disclosure can have various forms. For example, in some embodiments, the composites are in a form including, but not limited to, a scaffold, a porous scaffold, microspheres, fibers, films, lamellar forms, honeycomb forms, flakes, particles, platelets, and combinations thereof. In some embodiments, the magnetic materials of the present disclosure a parallel to one another. In some embodiments, chitosan bridges between individual flakes form a cellular structure within the cell wall composite In some embodiments, the composites of the present disclosure exhibit hierarchical structure. For example, in some embodiments, the composites are initially porous (or cellular solid). In some embodiments, the magnetic materials align parallel to the magnetic field that can result in a one-dimensional alignment. In embodiments where the magnetic materials are magnetic flakes, the aligned magnetic flakes can exhibit a two-dimensional shape to form a uniform cell wall with a nacre-like (brick-and-mortar) structure. In some embodiments, alignment of the uniform cell walls form a three-dimensional lamellar structure.

In some embodiments, the magnetic materials share a same orientation. In some embodiments, the cell walls (i.e., portion formed after removal of water and/or solvents) are ire a plate-like formation. In some embodiments, the plate-like formation includes plates that are parallel to one another to form a mono-domain structure in a plane that is parallel to both the external magnetic field and the solidification direction. In some embodiments, structures that are porous can be compacted and/or compressed to remove porosity (e.g., porosity between cell walls).

In some embodiments, the magnetic materials form head-to-tail chains. In some embodiments, the magnetic materials form mono-domain structures. In some embodiments, the magnetic materials are spaced apart from one another laterally in a nacre-like packing. In some embodiments, the nacre-like packing includes packed sheets of the magnetic materials. In some embodiments, thickness between packing is about 1 to 3 microns thick between sheets of the magnetic materials. In some embodiments, the thickness between packing is a few microns thick between sheets of the magnetic materials. In some embodiments, the thickness between formed cell walls (e.g., formation of residual material after removal of water and/or solvents) is up to 200 microns thick. In some embodiments, the thickness between formed cell walls can be about 20 microns thick. In some embodiments, the thickness between formed cell walls can be about 50 microns thick. In some embodiments, the thickness between formed cell walls can be about 100 microns thick. In some embodiments, the thickness between formed cell walls can be about 200 microns thick. In some embodiments, the thickness between formed cell walls can be in the range of about 10 to 250 microns.

In some embodiments, alignment of the magnetic materials (e.g., particles) results in a one-dimensional structure. In some embodiments, alignment of the cell wall materials formed via the methods herein form a two-dimensional nacre-like (brick-and-mortar) structure. In some embodiments, alignment of the two-dimensional nacre-like structures form three-dimensional lamellar structures. In some embodiments, the composites have an aligned and/or uniform architecture.

In some embodiments, the magnetic materials of the present disclosure are "glued" together via polymers in the binder to form various structures of the composite. For example, the composites of the present disclosure can include magnetic flakes "glued" together by a binder composed of chitosan polymer. In some embodiments, after removal of water, solvents, and the like from the mixtures during the solidifying and/or sublimation steps, polymer cell walls are formed on the outside of the magnetic materials. In some embodiments, the formation of cell walls form a structure that includes cellular material within the cell walls. In some embodiments, the cell walls form lamellar structured composites. In some embodiments, alignment of the composite structure facilitates compaction of the magnetic materials and alignment of cell walls to provide for minimal distortion of the structures of the composites.

In some embodiments, the composites of the present disclosure are in the form of a porous scaffold. In some embodiments, the composites of the present disclosure are compressed to form a composite with collapsed pores. In some embodiments, the composites are formed within the cell walls.

In some embodiments, the composites form cellular material within the cell walls. For example, in some embodiments, the cellular material can include, without limitation, polymers, binders, and combinations thereof.

In some embodiments, the composites of the present disclosure have a more regular and uniform alignment. In some embodiments, formed cell walls are aligned. In score embodiments, lamella structuring assists, at least in part, in enhancement of properties of the composite.

In some embodiments, the structures result in various enhancements to the properties of the composites. For instance, in some embodiments, the structures of the composites provide for improvement to mechanical, electrical, and thermal properties. In some embodiments, the structure of the composite allows for a factor of four increase in strength.

In some embodiments, the structure of the composite allows for a factor of four increase in stiffness. In some embodiments, the structure of the composite allows for a factor of two increase in toughness. In some embodiments, the structure of the composite allows for enhancement of magnetic properties. In some embodiments, the structure of the composite allows for enhanced absorption of energy.

Applications and Advantages

The methods, containers, and composites of the present disclosure can have various advantages. For instance, in some embodiments, the methods of the present disclosure can align magnetic flakes without significantly changing their position. Previous methods (e.g., previous freeze-casting methods) with an applied magnetic field frequently resulted in particles moving towards magnetic fixtures, thereby creating a non-homogeneous composite. According to various aspects of the present disclosure, the methods utilized herein are provided such that homogeneous composites can be formed.

In some embodiments, the composites of the present disclosure can be utilized for higher efficiency and smaller sized power electronic converters. This can result in the reduction of energy use and the overall cost of power converters.

In some embodiments, the methods of the present disclosure can reduce eddy current losses in magnetic core materials. In some embodiments, the methods of the present disclosure highly align platelet, or flake-shaped particles due to a shear flow between solvent crystals. In some embodiments, performance of the composites, for example, flake-based magnetic composites, can be significantly enhanced by alignment of magnetic flakes via the methods presented herein.

In some embodiments, magnetic fixtures of the containers of the present disclosure create a uniform flux so that magnetic materials are aligned, but not translated. In some embodiments, magnetic flake-based composites can be formed by the methods presented herein with one particle alignment along a primary solidification direction (e.g., a freezing direction) and an alignment perpendicular to the solidification direction that is parallel to the magnetic flux. In some embodiments, the bottom portions of the containers, for example, mold bottom designs described herein help create a single domain structure and further enhance alignment in the direction of the magnetic flux.

In some embodiments, the methods of the present disclosure provide for directional solidification, solidification in a magnetic field applied perpendicular to the direction of solidification, and a mono-domain sample structure resulting from a dual-thermal gradient. In some embodiments, the methods of the present disclosure reduce power loss in composite materials by aligning magnetic flakes with controlled ice crystal growth.

Additional Embodiments

Reference will now be made to more specific embodiments of the present disclosure and experimental results that provide support for such embodiments. However, Applicants note that the disclosure below is for illustrative purposes only and is not intended to limit the scope of the claimed subject matter in any way.

Example 1. Freeze-Cast Magnetic Composites for High Frequency Power Conversion While emerging thin-film magnetic materials offer significantly lower power losses than ferrites in the 1-100 MHz range, they are very expensive to manufacture and difficult to scale up to higher power levels. Composite materials composed of magnetic flakes embedded in an insulating binder have the potential to achieve low power loss at high frequency, while maintaining lower cost and better scalability than thin-films. The flakes can have low eddy current loss due to their small cross-sectional area. However, precise alignment of the flakes is required to minimize the loss.

A common theme for reducing power loss in magnetic core materials is to interleave thin layers of magnetic material with thin layers of an electrical insulator. When a time varying magnetic flux passes through a conductor (including many magnetic materials), it generates eddy currents which lead to power loss. Thin laminations of magnetic material decrease the amount of flux passing through a conductive region, thus reducing the magnitude of induced eddy currents. Instead of continuous laminations, some cores are composed of small magnetic particles in an insulating binder.

Commercially available powder cores are composed of individually insulated magnetic particles that are approximately 100 μm in size and offer lower loss than laminated tape wound cores but higher loss than ferrites. Several groups have made composite cores with magnetic flakes that have thicknesses in the 0.1-0.5 μm range. Since the cross-sectional area of these flakes is so small, they can potentially allow significant reduction of eddy current loss. However, the flakes must be precisely aligned with the magnetic field to have any benefit. Misalignment not only increases power loss, but could result in localized heating and thermal stress on the formed magnetic flake composite around a winding.

In this Example, Applicants attempted to align the flakes with (a) a magnetic field generated from the winding and (b) applying pressure to the assembly. Pressure alignment achieved better alignment of the flakes than magnetic field alignment. However, there were still large regions which were not aligned correctly and the performance peaked at 4 MHz, Hot pressed bare cores. (i.e., without an embedded winding) achieved better alignment of the flakes. The permeability of this material started to roll off at approximately 10 MHz and achieved very good, yet still imperfect alignment with hot pressing, which led to permeability roll off at 100 MHz and 1 GHz, respectively. These results show that the performance of flake composites is highly dependent on flake alignment and there is still some room for improvement.

Thus, processes that can better control flake alignment could greatly extend the capability of magnetic components. A promising approach to achieve improved particle alignment is the use of the freeze-casting process for the manufacture of the magnetic composite materials. The process has been shown to produce highly aligned "brick-and-mortar" structures with alumina platelets in a polymer binder.

Figure 2A:
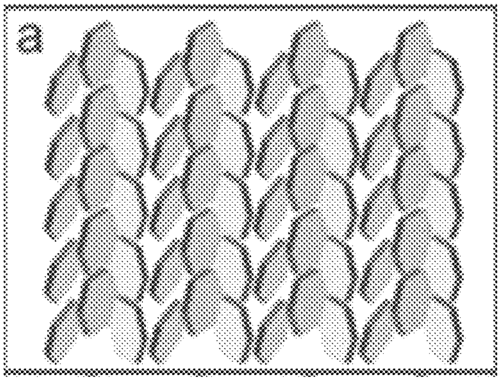
FIG. 2A, FIG. 2B, FIG. 2C, and FIG. 2D illustrate a schematic of magnetic flake self-assembly during freeze-casting.
Figure 2B:
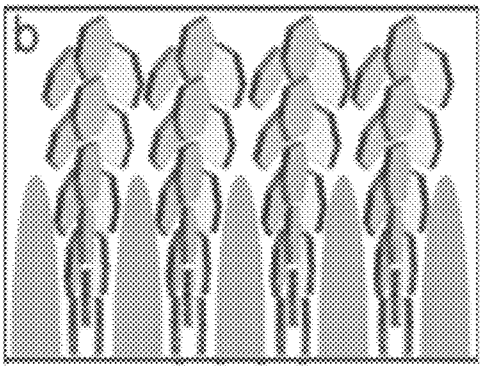
Figure 2C:
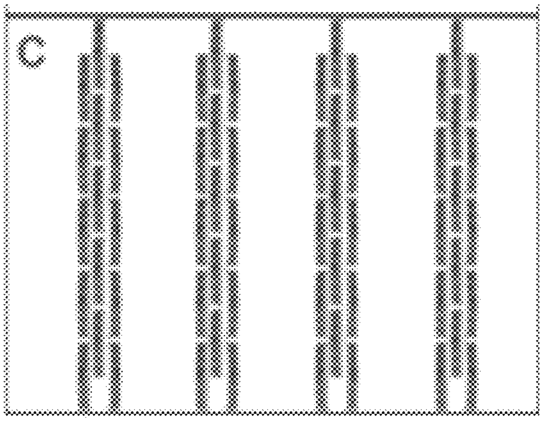
Figure 2D:
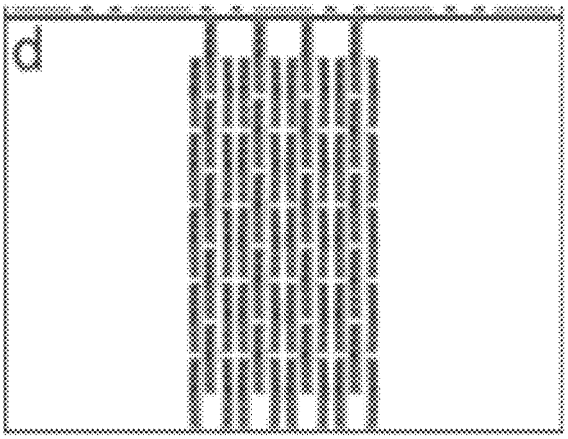

FIG. 2A, FIG. 2B, FIG. 2C, and FIG. 2D show a schematic representation of the freeze-casting of the magnetic composite, where a water-based slurry (FIG. 2A) with magnetic flakes and an insulting binder (not shown) is directionally solidified. As the ice crystals grow, the flakes align along the freezing direction due to a shear flow between the dendritic ice crystals (FIG. 2B). The ice is then removed by sublimation (lyophilized) and a porous scaffold of the flakes and binder remains (FIG. 2C). Finally, the sample is compressed to collapse the pores (FIG. 2D)). The binder provides insulation between the flakes to prevent eddy current conduction paths.

Figure 3:
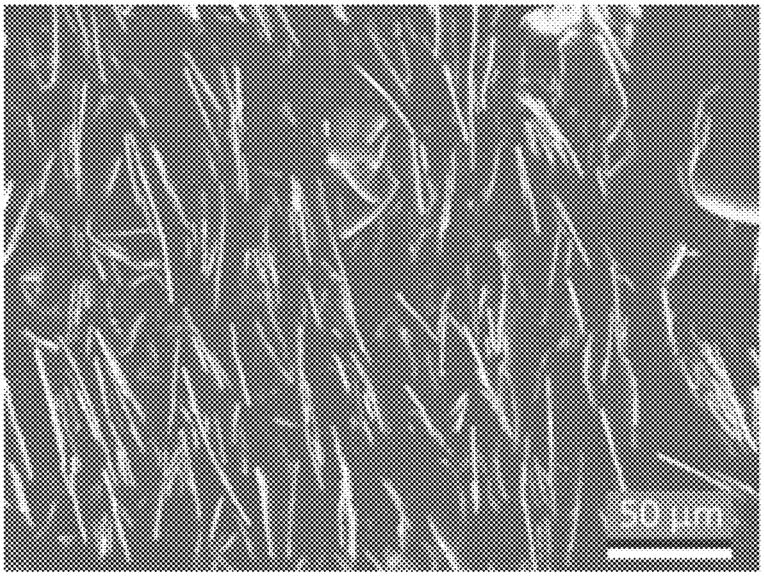
FIG. 3 illustrates a cross-section of freeze-cast magnetic flakes in a nanocellulose binder.

A freeze-cast magnetic composite was fabricated with a slurry of nanocellulose from the University of Maine and 0.6 μm thick permalloy flakes from Novamet. The slurry was mixed in a shear mixer, directionally solidified, and then lyophilized, Scanning electron microscopy revealed that the majority of the magnetic flakes within the sample's pore walls were indeed aligned with each other, as shown in FIG. 3. Hysteresis curves were measured with a vibrating sample magnetometer, resulting in permeability of 11.0 and saturation flux density of 180 mT, both of which are comparable to commercially available high frequency (>1 MHz) magnetic materials.

Example 1.1. Wedge-Bottom Molds and Magnetic Fixtures

For this Example, a polydimethylsiloxane (PDMS) wedge method is explored, as well as aligning the pores by application of an external magnetic field. The magnetic field method is able to hinder the growth of unfavorably oriented ice crystals, much like a tapered wall method. Freeze-casting magnetic particles in a magnetic field has been shown to alter the pore structure. For example, magnetic nanoparticles and various ceramics were freeze-cast in a rotating magnetic field to create a helical pore structure. However, particles were drawn toward the magnetic fixture because the field was non-uniform, which is an undesirable effect for Applicants application. In other work, a static magnetic field was applied to a freeze-cast suspension of magnetically coated alumina particles, resulting in alignment of up to 60% of the pores. Additionally, various works show that an application of a magnetic field to surface magnetized particles can align the particles within a composite structure. Thus, in addition to aligning the pores, applying a magnetic field during freeze-casting may further align flakes within the pore walls.

Figure 4:
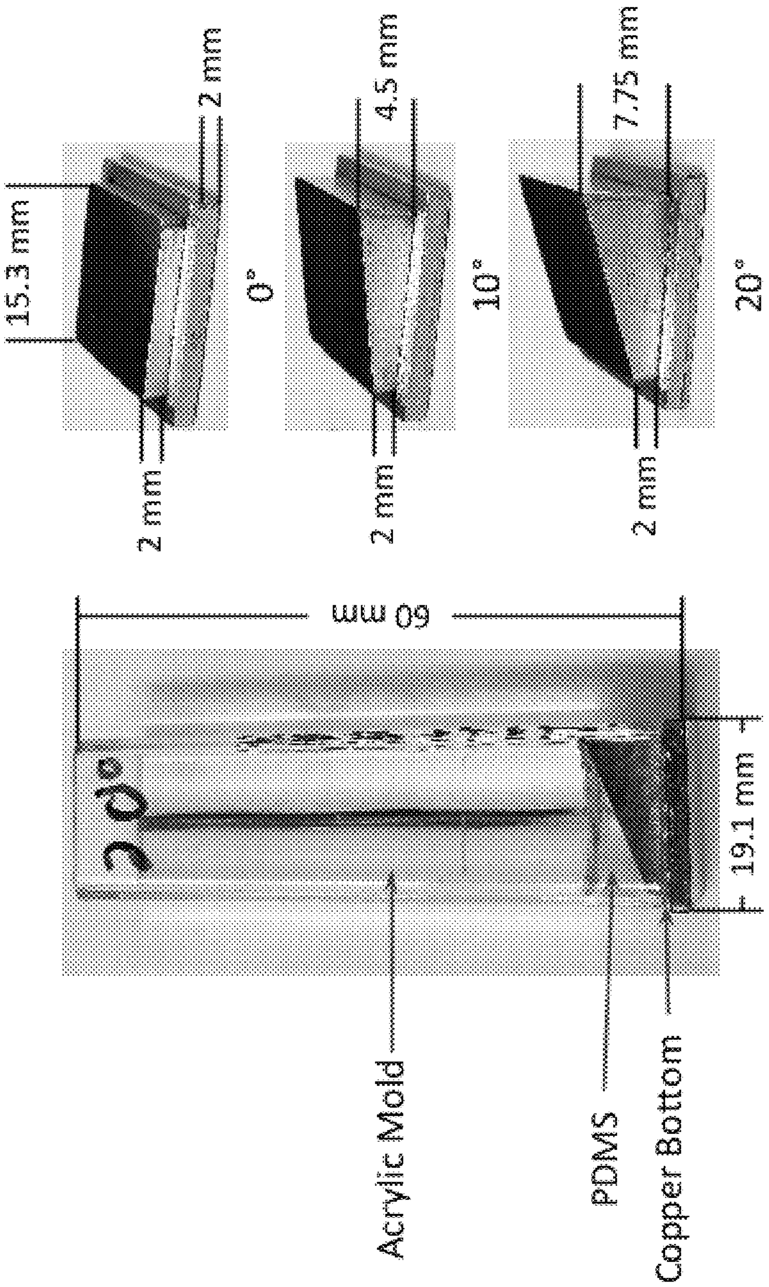
FIG. 4 illustrates photos of acrylic molds with a straight (0°) bottom, a 10° wedge bottom, and a 20° wedge bottom. The mold cross-section is square. Therefore, the 19.1 mm and 15.3 mm dimensions apply to the perpendicular edges as well.

Pore alignment with wedge-bottom molds is investigated in this Example. FIG. 4 shows photographs of the mold and the various copper bottoms. The mold is a square acrylic tube that fits tightly around the mold bottoms. The top surfaces of the copper bottoms appear black in the FIG. 4; however, they are actually highly polished and are reflecting a dark surface. The copper bottoms were inserted into the molds and PDMS was poured into the mold until only the tip of the mold bottom was exposed. No PDMS was used for the straight (0°) mold bottom.

Figure 5:
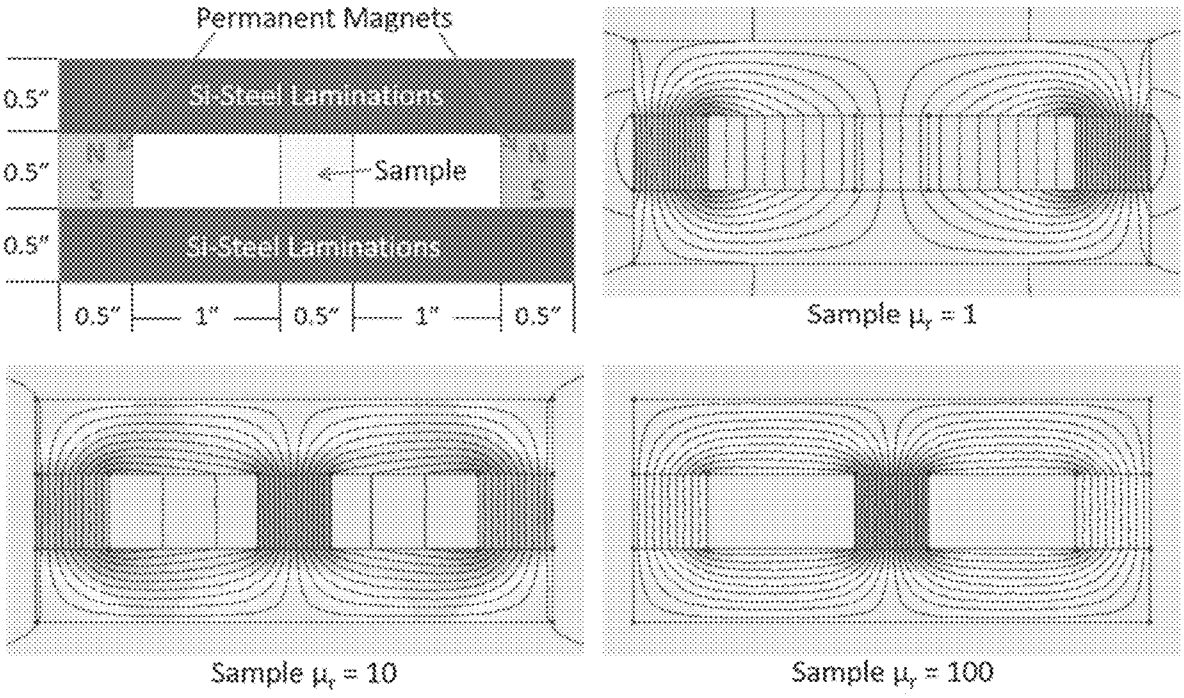
FIG. 5 illustrates a schematic of a magnetic fixture (top view) with finite element simulations for various sample permeabilities.

In order to apply a magnetic field while freeze-casting, a magnetic fixture was designed and built that securely attaches to the freeze-caster. FIG. 5 shows a top view of the fixture topology (upper left) and finite element simulations for different sample permeabilities. Neodymium permanent magnets (B884-N52, 52 MGOe, from K&J Magnetics, Inc.) are placed on the sides of the fixture with their north poles oriented in the same direction. Across the top and bottom are Si-steel laminations. This creates a uniform magnetic field between the top and bottom Si-steel pieces. As the sample permeability increases, more of the flux flows through the sample than the surrounding air; however, within the sample the flux remains uniform. Flux uniformity is important because it is desired for the magnetic flakes to rotate into alignment with the field but not translate their position. A non-uniform field would cause the flakes to move to regions of higher field concentration.

Figure 6:
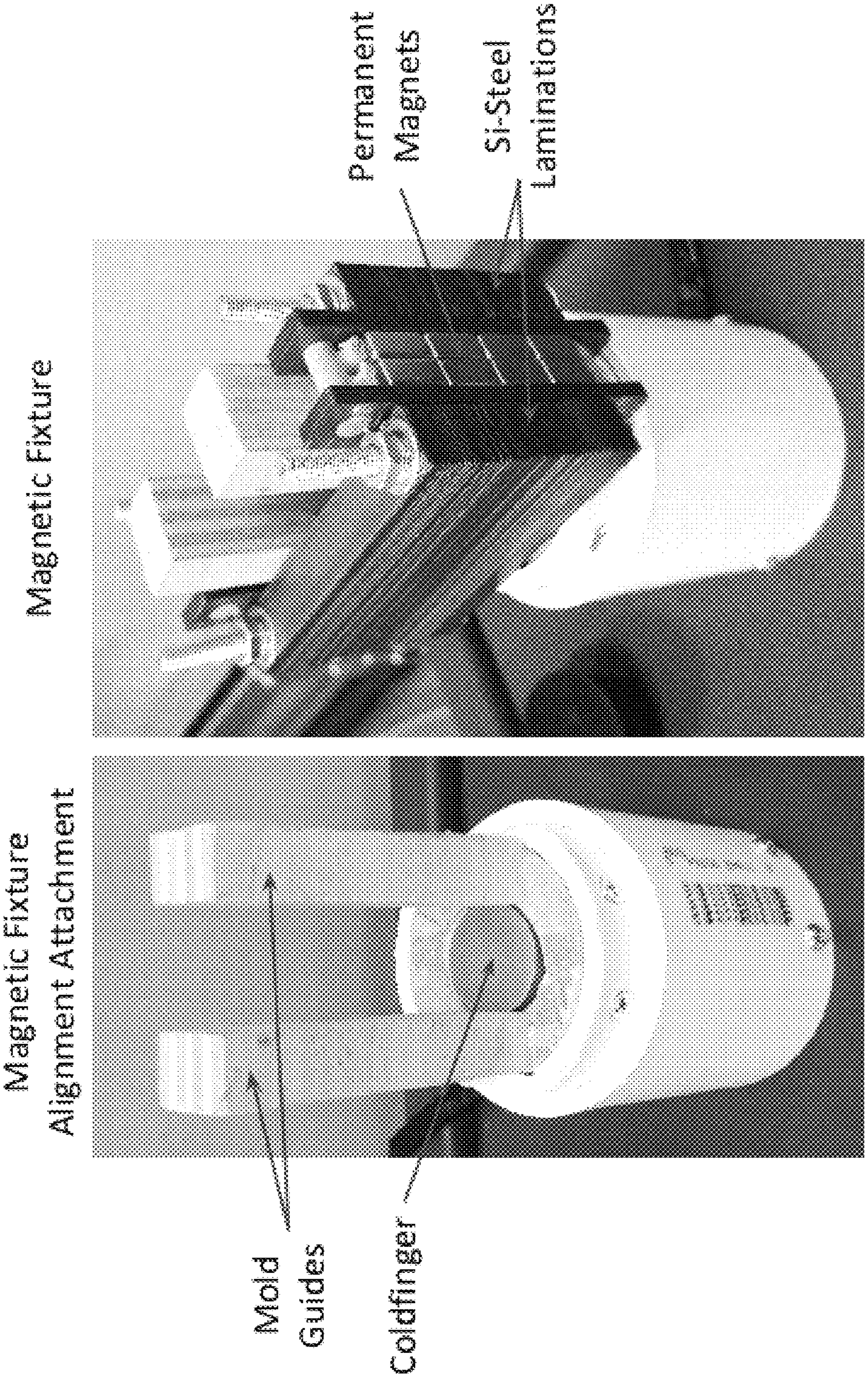
FIG. 6 illustrates photos of a magnetic fixture mounted on a single cold finger freeze-caster.

FIG. 6 shows the mounting bracket and completed magnetic fixture. The mounting bracket attaches to a polyvinyl chloride (PVC) collar on a single-finger freeze-caster. Two wooden mold guides ensure the mold and fixture align with the coldfinger.

Example 2. Magnetic-Field Assisted Manufacture of Composite Magnetic Materials for Low Loss Magnetic Cores This Example describes magnetic-field assisted manufacture of composite magnetic materials for low loss magnetic cores.

Despite extensive research, it remains challenging to manufacture flake- or platelet-based magnetic composites with a highly aligned, nacre-like flake structure in bulk. Many challenges can be overcome by freeze casting magnetic composites from flake-based slurries in an externally applied, uniform magnetic field. A careful structural characterization by scanning electron microscopy and X-ray microtomography reveal that the homogeneous magnetic field causes the flakes to align parallel to the B-field lines, thereby also forcing the structure to form a mono-domain structure in which all ice-templated lamellae align parallel to the B-field. In the case of appropriately sized flakes and flake concentrations, the flakes experience a second alignment parallel to the freezing direction because of a shear flow that occurs due to the volumetric expansion of the ice phase and mold contraction during the directional solidification. The resulting orthotropic structure of the freeze-cast magnetic composite is reflected also in orthotropic mechanical and magnetic properties of the material. The magnetic composites manufactured by magnetic-field assisted freeze casting outperforms by a factor of 2-4 in terms of stiffness, strength and toughness materials that were processed in the absence of a magnetic field and do not exhibit a monodomain lamellar architecture. Because of the highly aligned microstructure, it is possible to compact the initially lamellar composite with 90% porosity to at least 80% strain. The self-assembly process presented in this Example illustrates the tremendous potential for the creation of magnetic composites for use in power transformation.

Example 2.1. Introduction

Traditionally, power losses in magnetic core materials are reduced by interleaving thin layers of magnetic material with thin layers of an electrical insulator. When a time varying magnetic flux passes through a conductor (including many magnetic materials), eddy currents are generated which lead to power loss. Thin laminations of magnetic material decrease the amount of flux passing through a conductive region, thus reducing the magnitude of induced eddy currents. While emerging thin-film magnetic materials offer significantly lower power losses than ferrites in the 1-100 MHz range, they are very expensive to manufacture and difficult to scale up to higher power levels.

Figure 7A:
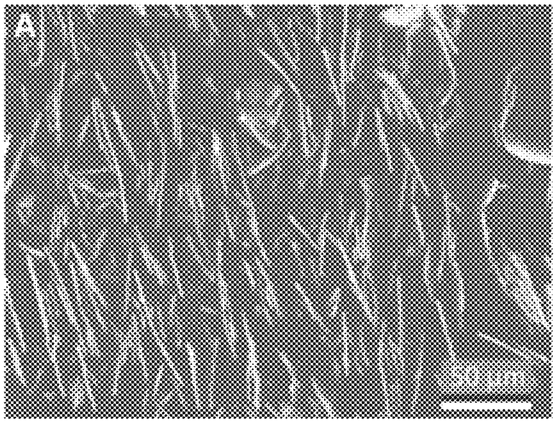
FIG. 7A illustrates a scanning electron microscopy (SEM) micrograph of Sendust flakes of 50 μm diameter and 2 μm thickness.

Instead of continuous laminations, some cores are composed of small magnetic particles embedded in an insulating binder. Commercially available powder cores are composed of individually insulated magnetic particles that are approximately 100 μm in size and offer lower loss than laminated tape wound cores but higher loss than ferrites. An alternative approach to achieve low power loss at high frequency, while maintaining lower cost and better scalability than thin films, are composite materials composed of magnetic flakes, such as those composed of Sendust (FIG. 7A) embedded in an insulating binder.

Advantages of magnetic flakes are that they not only have a low eddy current loss due to their small cross-sectional area but that their performance can further be improved by precise alignment. Several studies focused on composite cores manufactured with magnetic flakes of thicknesses in the 100-500 nm range. Since the cross-sectional area of these flakes is so small, they allow for a significant reduction of eddy current loss. However, for best performance, the flakes must be precisely aligned with the magnetic field to have any benefit. In fact, misalignment not only increases power loss, but could additionally result in localized heating and thermal stresses on the component.

Figure 7B:
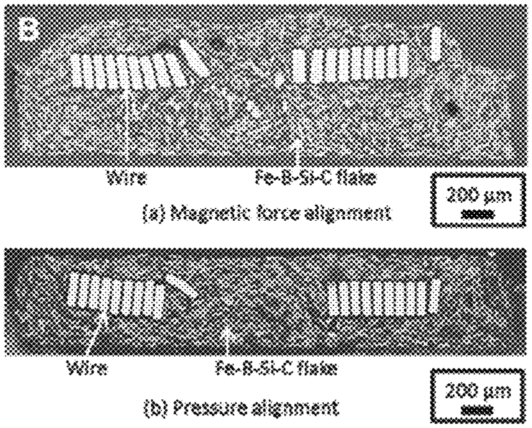
FIG. 7B shows an SEM micrograph of a magnetic flake composite.

To date, flake-based composites have been formed around a winding, as shown in FIG. 7B with flakes aligned with (a) a magnetic field generated from the winding and (b) applying pressure to the assembly. With pressure a better alignment of the flakes could be achieved than with the magnetic field alignment, however, there were still large regions which were not aligned correctly and the performance peaked at 4 MHz. In an alternative approach, bare cores (i.e., without an embedded winding) were hot pressed resulting in a better flake alignment.

Permeabilities achieved with these flake-based materials started to roll off at approximately 10 MHz. The materials of previous reports had very good, yet still imperfect particle alignment after hot pressing, which led to permeability rolloff at 100 MHz and 1 GHz. Combined, the results highlight that the performance of flake-based magnetic composites is dependent on the quality of flake alignment, and that there is still room for improvement. Thus, processes with which a better control of flake alignment can be achieved could greatly extend the capability of magnetic components.

A novel and highly promising approach for the manufacture of low loss magnetic composites with highly aligned flakes is freeze-casting. Freeze casting, also termed ice-templating, is based on the directional solidification of water-based particle slurries. Initially, the process was shown to produce highly aligned, nacre-like microstructures with alumina platelets in a polymer binder. The platelet-polymer composite forms, when the water-based slurry solidifies directionally and dendrites of pure ice grow in the direction of the temperature gradient. Nacre-like lamellae self-assemble in the interdendritic spaces because of an interdendritic shear flow, which is caused by the volumetric expansion of the ice phase and forces the flakes to align with their long dimension parallel to the freezing direction to then be 'glued' by the polymer phase. Additionally, multiple studies have been performed to investigate alignment effects of an externally applied magnetic field on paramagnetic spheres, rods, and flakes of different shapes, including magnetic nanoparticle-decorated alumina platelets.

Combining the process of ice templating with the application of an externally applied magnetic field, it could be shown that the structural alignment of particles surface magnetized with magnetic nanoparticles (MNP) could, indeed, be further modified, and that their properties could be custom-designed. Applying, for example, a static external magnetic field during the solidification of MNP-decorated alumina particles and platelets resulted in 60% of the cell walls aligning with the field; freeze casting titania in a rotating magnetic field resulted in a helical sample architecture. However, investigating the magnetic freeze casting system used in these studies further, it became apparent that the magnetic flux in the round mold was not uniform. As a result, the surface-magnetize particles were not only rotated but also translated and thus concentrated toward the magnetic fixture, which is an undesirable effect for Applicants' application and thus needed to be eliminated.

Inspired by these earlier results, Applicants chose as their approach to the manufacture of magnetic composites to freeze cast low loss magnetic flakes (suspended in an electrically insulating and optimally also thermally conducting binder, to alter thermal performance) in an externally applied uniform magnetic field. The goal was to achieve a monodomain material architecture, in which nacre-like lamellae composed of highly aligned magnetic flakes are aligned both parallel to the freezing direction and, perpendicular to it, parallel to the applied magnetic field. The objective was to explore the promise of magnetic freeze casting as a route for the manufacture of flake-based magnetic composites with reduced eddy current losses, for which currently no suitable, cost-effective manufacturing process exists.

Example 2.2. Magnetic Flake Slurry Preparation

To prepare the magnetic flake slurry, chitosan (low molecular weight, Sigma-Aldrich, MO, USA) was dissolved in 1% acetic acid in deionized water (Glacial, ACS grade, EMD Millipore) on a roller mixer to prepare a 3% w/v solution. Sendust flakes (Fe—Si—Al, 300 mesh, Chengdu Huarui Industrial Co., Ltd.) were added to the solution to prepare a 27% w/v slurry, which corresponds to a 9:1 mass ratio of magnetic flakes to chitosan binder. The slurry was homogenized with a high shear SpeedMixer (DAC 150 FVZ-K, FlackTek, Landrum, SC) for 90 s at 2000 rpm.

Example 2.3. Magnetic Fixture to Achieve Homogeneous Magnetic Flux

Figure 8A:
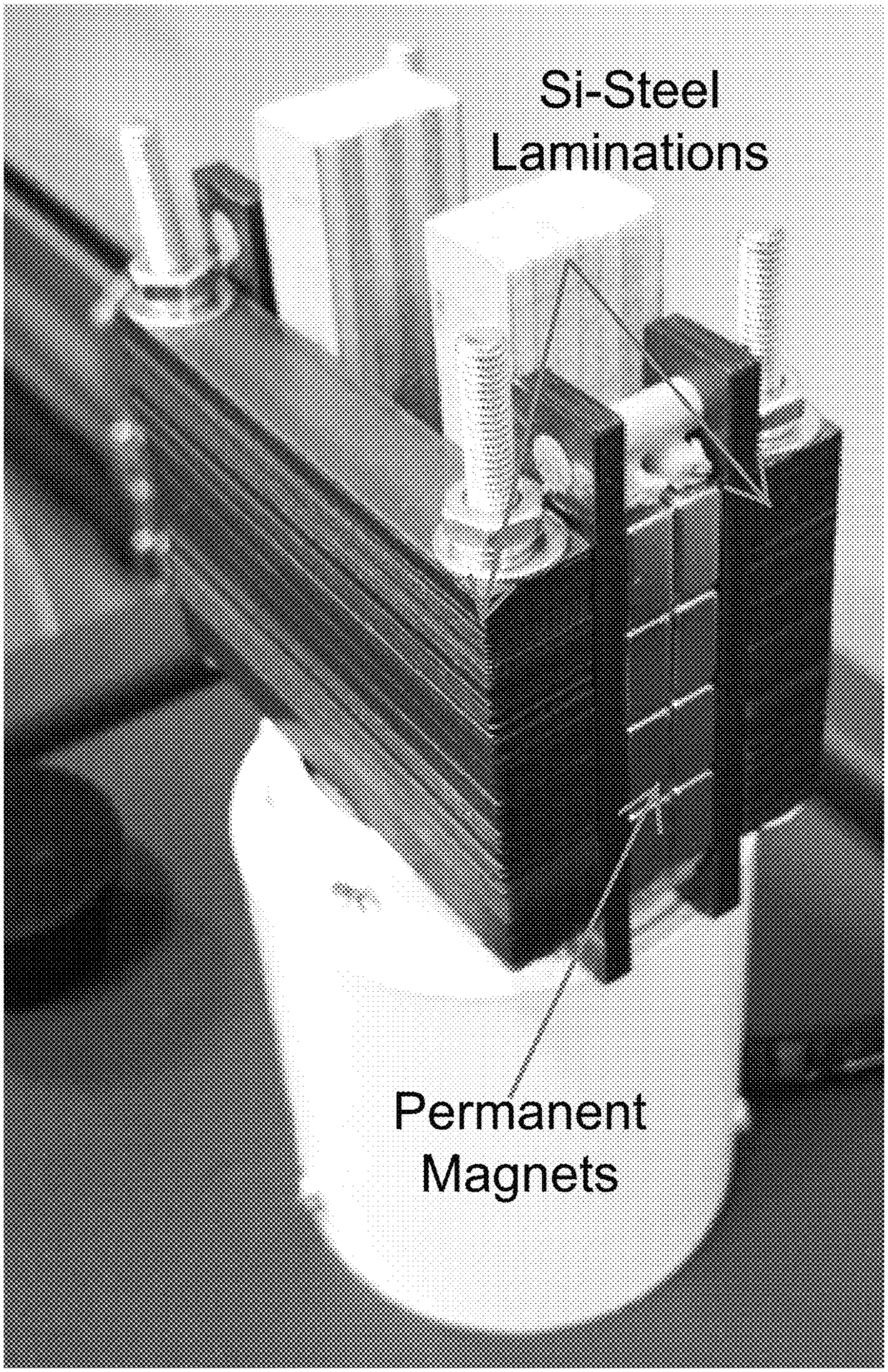
FIG. 8A illustrates a photograph of the magnetic freeze casting fixture.
Figure 8B:
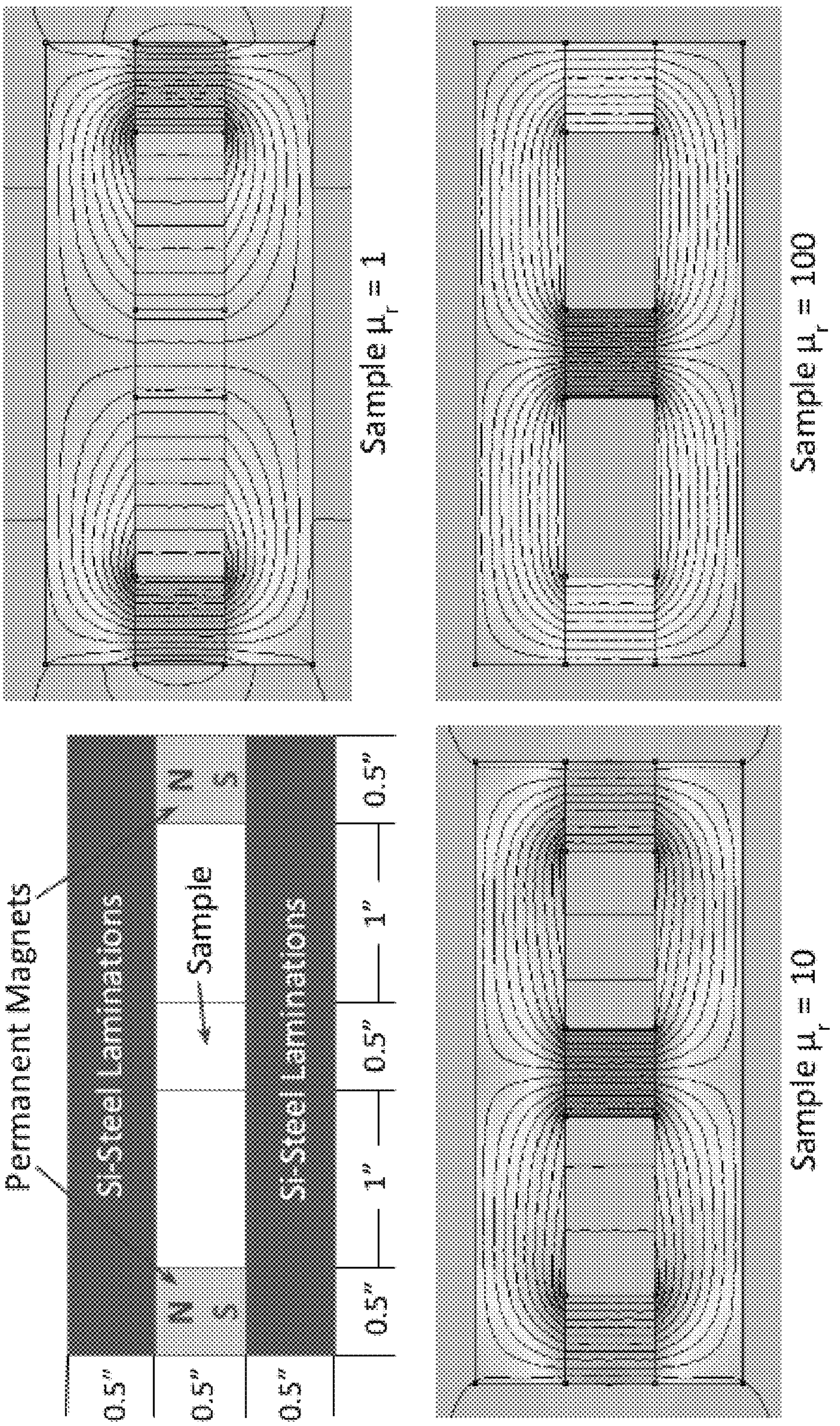
FIG. 8B illustrates a schematic of the magnetic fixture (top view) with finite element simulations for sample permeabilities, $\mu_r$, of 1, 10, and 100, highlighting the uniform magnetic flux in the square sample in all cases.
Figure 9:
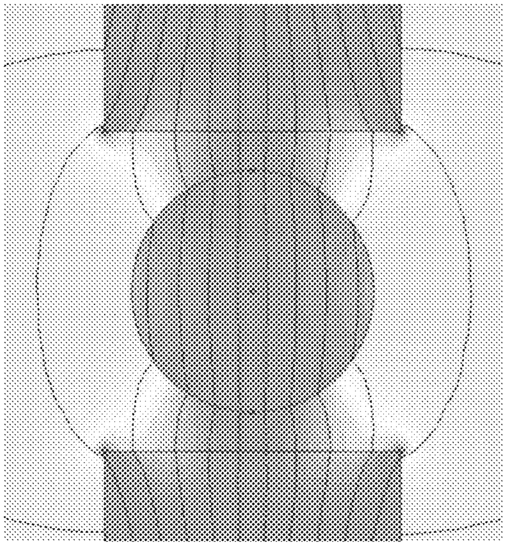
FIG. 9 illustrates finite element simulation of the non-uniform magnetic flux in a round mold of 20 mm diameter, which causes particles to experience not only a torque for alignment but also a force that translates them.
Figure 10A:
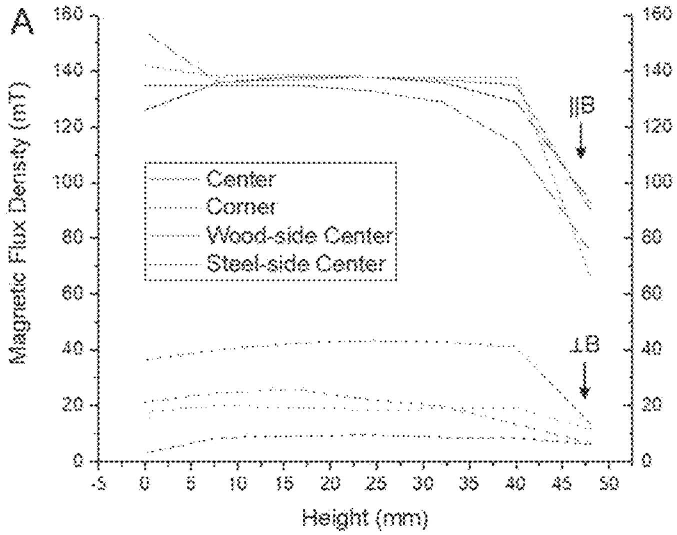
FIG. 10A and FIG. 10B illustrate magnetic flux density (FIG. 10A) within the magnetic fixture (FIG. 10B), in the direction parallel (||B, where B is the magnetic field) and perpendicular (⊥B) to the major magnetic B field direction.
Figure 10B:
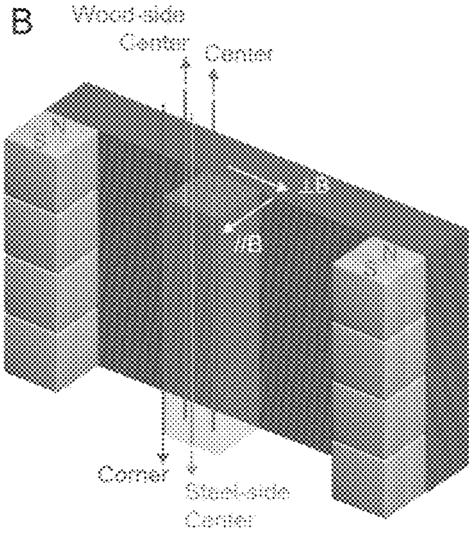

In order to apply a uniform magnetic field to the slurry during freeze-casting, a magnetic fixture was custom-designed and built, in which neodymium permanent magnets (B884-N52, 52 MGOe, K&J Magnetics, Inc., Bucks County, PA) were placed on the sides of the fixture with their north poles oriented in the same direction, and sandwiched between Si-steel laminations across the top and bottom of the stack (FIG. 8A). FIG. 8B shows the top view of the fixture topology (upper left) as well as finite element simulations for sample permeabilities, $\mu_r$, of 1, 10, and 100. The result is a fixture that results in a uniform magnetic field between the top and bottom Si-steel plates laminations. FIG. 8B illustrates that, as the sample permeability increases, more of the flux flows through the sample than the surrounding air, but that within the sample the flux remains uniform. Flux uniformity is important, because Applicants want the magnetic flakes to rotate into alignment with the field, but not translate their position. A non-uniform field, such as the one generated by a permanent magnet in a round mold (FIG. 9), would cause the flakes to move to regions of higher field concentration. The magnetic flux densities in the sample space were measured with a Gaussmeter (Model 424, LakeShore, Westerville, OH) along its vertical axes at four different positions: center, corner, midpoint of steel lamination side and wood side (FIG. 10A and FIG. 10B).

Example 2.4. Magnetic-Field Assisted Freeze Casting

To freeze cast magnetic composites, an acrylic square mold of 25.4 mm (1 in) side length, 60 mm height and 1.59 mm (1/16 inch) wall thickness, sealed with a copper bottom plate, was filled to 35 mm height with the magnetic flake slurry, then placed in the custom-design magnetic fixture (FIG. 8A and FIG. 8B) and atop the temperature-controlled copper cold finger of a freeze caster, detailed in previous studies. To directionally solidify the sample, the cold finger temperature was decreased at a constant applied cooling rate of 10° C./min until a temperature of −150° C. was reached. Once fully frozen, the sample was removed from the cold finger, demolded with a punch, and lyophilized in a FreeZone 6 Freeze Dry System (Labconco, Kansas City, MO) for at least 72 hours at 0.008 mbar pressure and −85° C. coil temperature.

Example 2.5. Scanning Electron Microscopy (SEM) and Focused Ion Beam (FIB)

The architecture of the freeze-cast composites and the microstructure of the cell walls were characterized by scanning electron microscopy (SEM) (Vega 3, TESCAN, Czech Republic), and with a combined SEM-FIB (focused ion beam) system (Scios 2, FEI, Hillsboro, OR, USA). SEM micrographs were taken on the Vega 3 with an accelerating voltage of 5 kV at a working distance of 10 mm. Cross-sections of individual cell walls were FIB-milled cutting a wedge of 25 μm×30 μm side length and 25 μm depth using a beam current of 7 nA for the bulk cut and 70 pA for cleaning at an acceleration voltage of 30 kV, before imaging with the SEM with an accelerating voltage of 2 kV and a beam current of 0.1 nA.

Example 2.6. X-ray Microtomography

The architecture of the freeze-cast magnetic composite was analyzed in 3D by X-ray microtomography performed with a Skyscan 1272 system (Bruker, Kontich, Belgium) using an X-ray source operated at 70 kV and 142 μA with 0.5 mm Al filter. The pixel size was 4 μm after 2×2 binning. Radiographs of 2456 pixels×1640 pixels were recorded, corresponding to a field of view of 9.8 mm×6.6 mm. Rotating the sample at 0.6° step size from 0° to 360°, 600 projections were recorded per tomogram. Tomographic reconstructions were obtained with the NRecon software (Version 1.6.10.1, Bruker Kontich, Belgium). Volume renderings and sample cross-sections were created using Avizo 9.0 (FEI, Hillsboro, OR, USA).

Example 2.7. Mechanical Testing

Figures 15A, 15B, 15C:
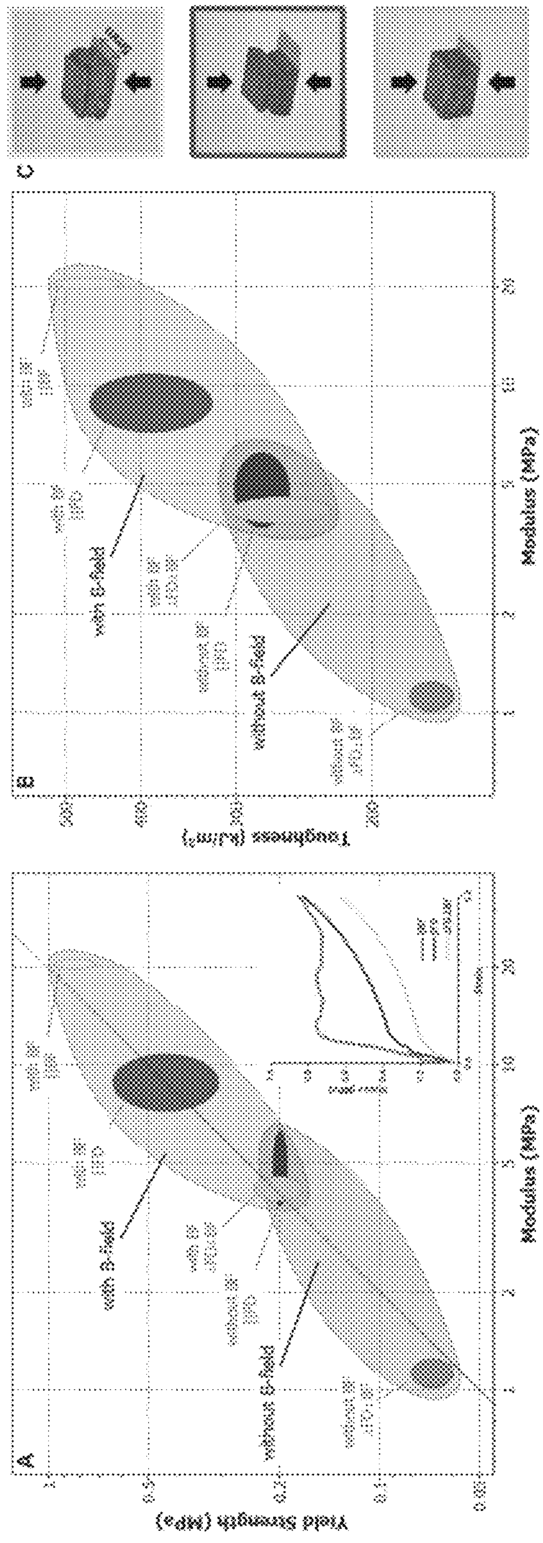
FIG. 15A, FIG. 15B, and FIG. 15C illustrate a property chart showing the correlation between yield strength and modulus. The top images depicted the appearance of the samples after testing, with the frame color-coded corresponding to the legend in the typical stress-strain curve showing at the bottom right.

For mechanical testing, 5 mm cubes were cut with a diamond wire saw (Model 4240, WELL Diamond Wire Saws, Inc., Norcross, GA, USA) at a height of 17.5 mm measured from the sample bottom to the cube center. At least three cubes were tested for each composite sample and each of the different directions of compression. In the case of samples frozen without a magnetic field, the samples were tested with the force applied parallel (||FD) and perpendicular (⊥FD) to the freezing direction. In the case of samples frozen in the magnetic field, the mechanical properties were determined parallel to the freezing direction (||FD), and perpendicular to the freezing direction both parallel (||BF) and perpendicular (⊥FD⊥BF) to the magnetic field direction. Mechanical testing was carried out in compression on a universal testing machine (Model 4442, Instron, Norwood, MA, USA) with a 50 N load cell and a cross head speed of 0.05 mm/s, corresponding to a strain rate of 0.01/s. A typical stress-strain curve is shown in FIG. 15A, FIG. 15B, and FIG. 15C. The values for the Young's modulus were calculated from the slope of the initial linear region. The yield strength was taken to be the peak stress before compaction when a yield point existed or determined from the point of intersection between the tangent line to the elastic region and the tangent line of the plateau, or collapse region, in the absence of a yield point. The toughness was calculated from the area underneath the compression curve up to a strain of 60%.

Example 2.8. Magnetic Performance Measurements

Reference magnetic composite samples with randomly aligned flakes were used to verify the magnetic performance improvement effected by flake alignment. To produce the reference samples, Sendust flakes were thoroughly mixed with PDMS and allowed to cure for two days; both toroidal and cubical samples with randomly aligned flakes were prepared. Additionally, a flake-PDMS composite was created in which the flakes were aligned by attaching a permanent magnet to the mold during the entire cure time.

To measure the permeability of the flake-PDMS composite, the toroidal sample was wound as a two-winding transformer in a closed magnetic circuit. The "Ref" traces in FIG. 16A, FIG. 16B, FIG. 17A, FIG. 17B, FIG. 18A, FIG. 18B, FIG. 19A, and FIG. 19B are measurements of the toroid, and the "A", "B", and "C" traces of the cubic reference core were measurements in three different directions. The quality factors of the flake-PDMS and the freeze-cast magnetic composite cores were measured from 10 kHz to 1 MHz with a custom-designed, capability-proven magnetic impedance measurement fixture based on an open magnetic circuit characterization method. The 5 mm side-length freeze-cast composite cubes tested were cut as described above for the mechanical testing samples, and their quality factors determined along the same three directions: parallel to the freezing direction, and perpendicular to the freezing direction both parallel and perpendicular to the magnetic field direction.

Example 2.9. Structural Characterization

Volume fractions of Sendust and chitosan in the slurry, the freeze-cast magnetic composite, the cell wall material, and the compacted magnetic composite (Table 1) were calculated with a density of solid chitosan of 1.31 g/cm$^3$ and a density of the Sendust flakes (85% Fe, 9% Si, and 6% Al) of 6.82 g/cm$^3$. The density of the freeze-cast magnetic composite after lyophilization was 0.354±0.011 g/cm$^3$ (freeze cast in the presence of a magnetic field) and 0.278±0.024 g/cm$^3$ (freeze cast in the absence of a magnetic field), which corresponds to an overall porosity of 94.3% and 95.6%, respectively.

The magnetic composite material composition of the slurry and the volume fractions of the cell wall after lyophilization (assuming 0% porosity) is tabulated in Table 1. At a sample compaction to 80% strain, the overall porosity of the material is reduced from 94.3% and 95.6% to 63.1% and 71.2%, for the composite freeze cast in the presence and in the absence of the magnetic field, respectively.

TABLE 1

Magnetic composite material composition of slurry, after lyophilization, and after compaction.

| Composition/ Materials | Slurry % (w/v) | Cell Wall, after Lyophilization, Fully Dense (Theoretical) % (v) |
|---|---|---|
| Sendust Flakes | 27 | 63.4 |
| Chitosan | 3 | 36.6 |

Example 2.10. Scanning Electron Microscopy (SEM) and Focused Ion Beam (FIB)

Figures 11A, 11B, 11C, 11D, 11E, 11F:
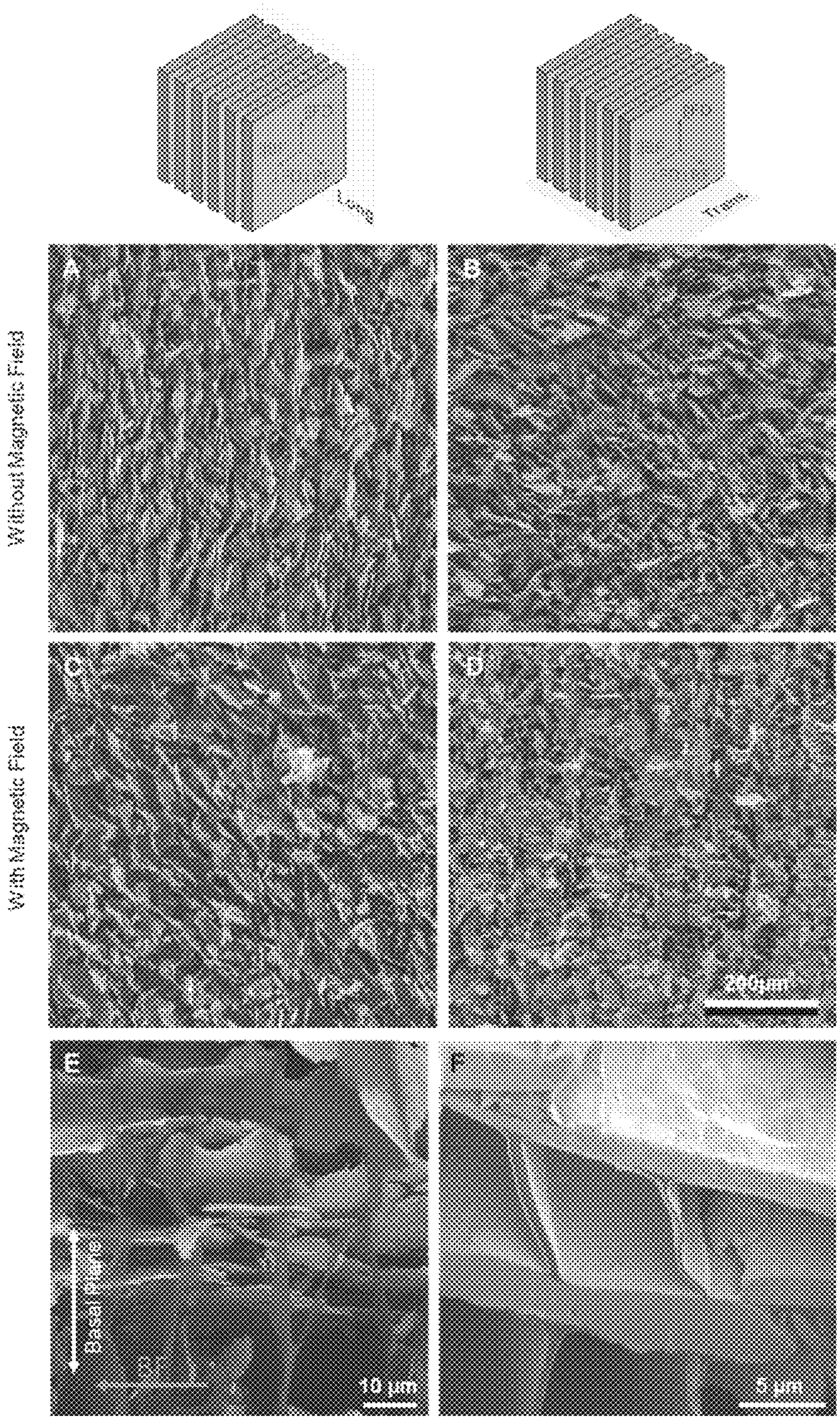
FIG. 11A, FIG. 11B, FIG. 11C and FIG. 11D share the scale bar shown in FIG. 11D. Scanning electron micrograph of (FIG. 11E) the transverse cross-section in the back-scattered electron mode, and (FIG. 11F) the FIB cross section through a stack of cell walls, both of a magnetic composite frozen in the 0° mold in the magnetic field.

A comparison of the SEM micrographs of magnetic-flake composites frozen in the presence and the absence of an external magnetic field reveals that in both the cell walls are aligned parallel to the freezing direction (FIG. 11A and FIG. 11B). Additionally, the cell walls are aligned parallel to the externally applied magnetic field in the sample frozen in the magnetic, forming the desired monodomain structure (FIG. 11C and FIG. 11D). Noteworthy is also a difference in flake alignment within the cell walls. The flakes form a nacre-like structure with the flakes aligned parallel to the freezing direction in the case of the composites frozen in the absence of a magnetic field. In contrast, the magnetic flakes align with their long axis with the magnetic field, but also rotate around the magnetic field direction. The outcome is a greater amount of porosity within the cell walls of the latter, in which chitosan bridges between individual flakes form a cellular structure also within the cell wall composite (FIG. 11E and FIG. 11F).

The FIB-milled cross-sections of the cell walls highlight that the magnetic flakes line up mostly head to tail and rarely side by side, and that they do not closely pack, particularly when self-assembled in the presence of the magnetic field.

Example 2.11. X-Ray Microtomography

Figure 12A:
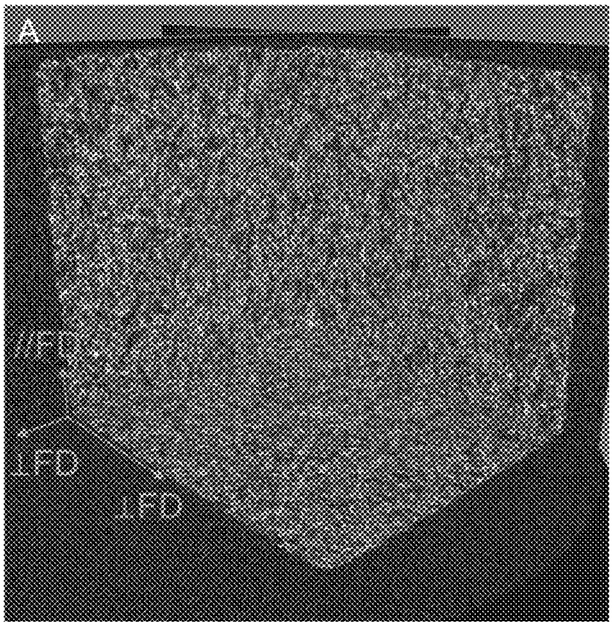
FIG. 12 illustrates orthogonal cross-sections (||FD, ||BF, and ⊥FD⊥BF; where FD is freezing direction and BF is magnetic field direction) of the volume rendering of the magnetic composite (FIG. 12A) freeze-cast without the magnetic field and (FIG. 12B) in the presence of the magnetic field.
Figure 12B:
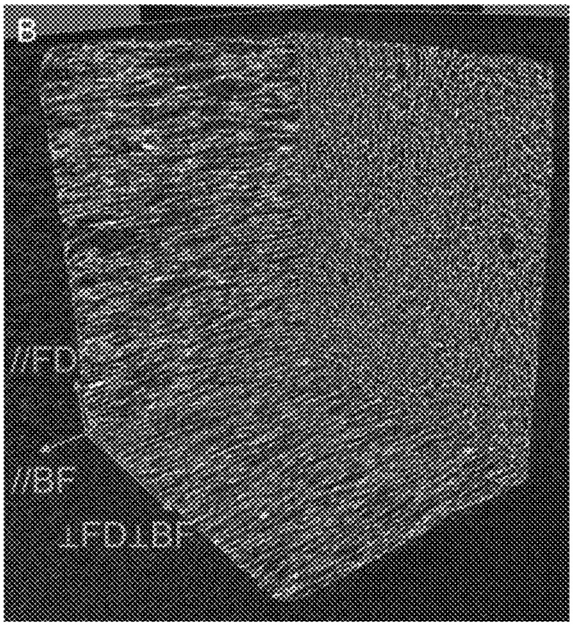
Figure 13:
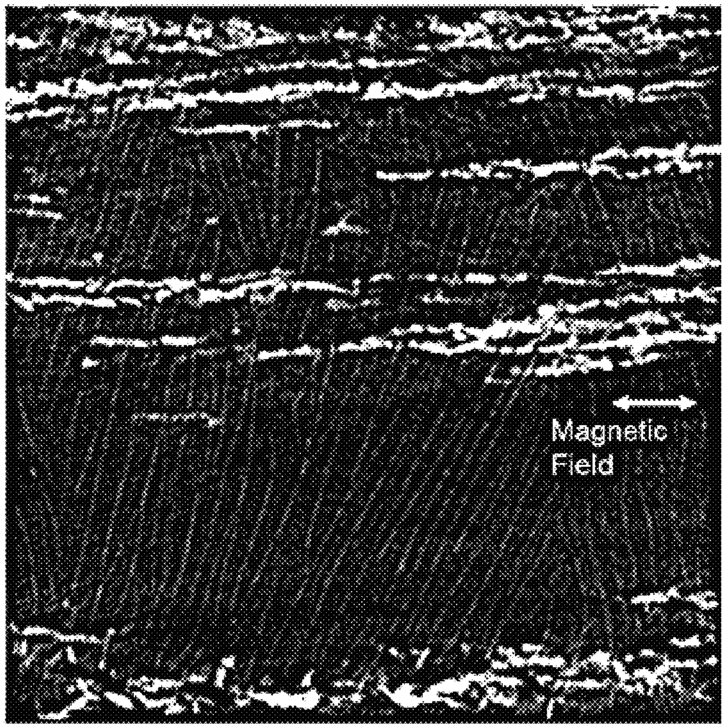
FIG. 13 illustrates a cross-section perpendicular to the freezing direction (of X-ray tomogram) near the top of the sample of a composite frozen in the presence of a magnetic field revealing flake and cell wall alignment.
Figure 14A:
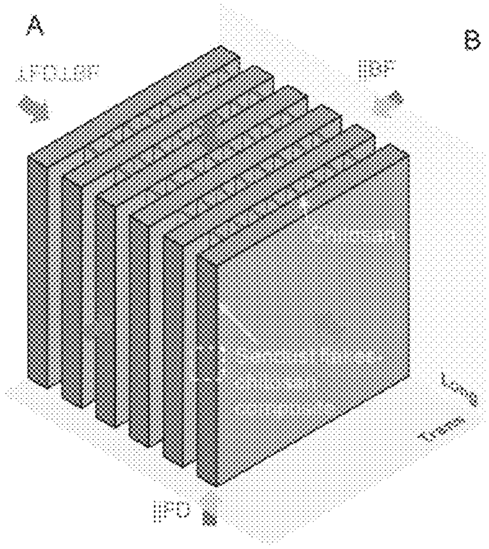
FIG. 14A illustrates a schematic of the monodomain structure with its nacre-like magnetic-flake composite cell walls.
Figure 14B:
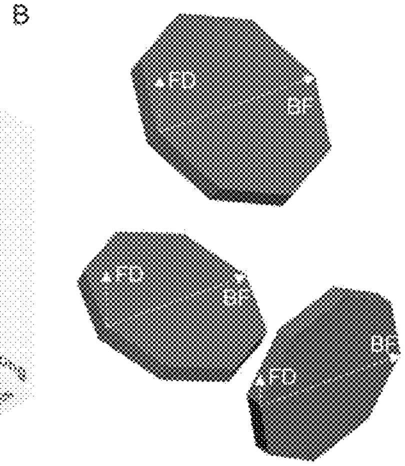
FIG. 14B illustrates a schematic of the observed flake rotation around the B-field direction.

The volume renderings of the X-ray microtomograms of the magnetic-flake composites frozen in the presence and the absence of an external magnetic field confirm the observations made by SEM and FIB. FIG. 12A and FIG. 12B illustrate the microstructure in the case of the composite frozen in the absence and in the presence of the magnetic field, respectively. The chitosan phase is barely visible in the volume rendering of FIG. 13 due to the combination of the low thickness of the structures that they form and, of course, their low X-ray absorption. FIG. 14A shows a schematic of the monodomain structure with its nacre-like magnetic-flake composite cell walls. FIG. 14B illustrates the observed flake rotation around the B-field direction.

Example 2.12. Mechanical Characterization

The structural characterization indicates that the samples frozen without a B-field, have a honeycomb-like structure with a structure transverse to the freezing direction that may be considered isotropic, so that only two directions need to be distinguished, parallel to the freezing direction (||FD) and perpendicular to the freezing direction (⊥FD). This is in contrast to the samples frozen in the presence of a B-field, in which three orthotropic directions need to be distinguished: ||FD, and perpendicular to the freezing direction ⊥FD both parallel (⊥FD||BF) and perpendicular to the B-field (⊥FD⊥BF). FIG. 15A, FIG. 15B, and FIG. 15C show typical stress-strain curves for the magnetic-flake composites frozen in an externally applied B-field, tested ||FD and both ⊥FD ||BF and ⊥FD ⊥BF. After a linear elastic region, the samples yield and exhibit a plateau region, during which the samples compact. Table 2 lists modulus, yield strength, and toughness (work to 60% strain).

The magnetic composite frozen in the presence of a B-field is stiffest and strongest in the ⊥FD||BF-direction with values twice as high as in the ||FD-direction, and four times as high as the values in the ⊥FD⊥BF-direction. The values for the modulus and the yield strength of samples frozen without a B-field are in the ||FD-direction only about a quarter of the stiffest and strongest direction of the sample frozen in a B-field. In the ⊥FD-direction, the values for the modulus and the yield strength are about a quarter and a third, respectively, of the ⊥FD⊥BF-direction of the samples frozen in the presence of a B-field.

The toughness (work to 60% strain) of the magnetic composite is highest perpendicular to the freezing direction, parallel to the B-field (⊥FD ||BF). In this direction it is about 20% higher than the value parallel to the freezing direction (||FD) and about 80% higher than that perpendicular to the freezing direction and perpendicular to the magnetic field (⊥FD ⊥BF) direction in the sample frozen in the B-field, and three times higher than the toughness perpendicular to the freezing direction in the case of the sample frozen in the absence of a B-field. The value in the tougher direction of the sample frozen without B-field is about the same as the least tough in the sample frozen in a B-field and about two thirds higher than the toughness perpendicular to the freezing direction (⊥FD).

The property charts of FIG. 15A, FIG. 15B, and FIG. 15C illustrate the correlation between (FIG. 15A) yield strength and modulus and (FIG. 15B) toughness and modulus, typical for porous or cellular materials with a modulus to yield strength ratio in all three directions of about 20, and a toughness that reflects the degree of particle rotation and interlocking in addition to preferential particle alignment.

TABLE 2

Mechanical properties (mean ± standard deviation) of the composite freeze cast with and without magnetic field in compression parallel to the freezing (||FD), the magnetic field (||BF), and perpendicular to the freezing (⊥FD, frozen without B-field) or perpendicular to both directions (frozen with B-field, ⊥FD⊥BF).

| | | Modulus [MPa] | Yield Strength [MPa] | Toughness [kJ/m³] |
|---|---|---|---|---|
| Frozen with B-Field | n = 3 | | | |
| ‖FD | | 8.98 ± 1.79 | 0.47 ± 0.17 | 394.72 ± 70.84 |
| ‖BF | | 20.42 ± 0.65 | 0.84 ± 0.12 | 471.35 ± 47.25 |
| ⊥FD ⊥BF | | 4.16 ± 0.35 | 0.21 ± 0.03 | 266.35 ± 39.51 |
| Frozen without B-Field | n = 3 | | | |
| ‖FD | | 4.95 ± 1.27 | 0.20 ± 0.01 | 279.58 ± 22.82 |
| ⊥FD | | 1.12 ± 0.11 | 0.07 ± 0.01 | 168.16 ± 10.77 |

Example 2.13. Preliminary Magnetic Performance Measurements

Both the samples frozen in the presence of a B-field and those frozen in the absence of a B-field were characterized in three orthogonal directions: ||FD, ⊥FD||BF, and ⊥FD⊥BF. FIG. 16A, FIG. 16B, FIG. 17A, FIG. 17B, FIG. 18A, FIG. 18B, FIG. 19A, and FIG. 19B illustrate the anisotropy of the real and imaginary parts of the permeability and the quality factors determined on the PDMS control samples, and on the magnetic composites freeze cast in the absence and in the presence of a B-field. The results reflect the structural anisotropy first observed in the structural then also in the mechanical performance of the freeze-cast composites.

Figure 16B:
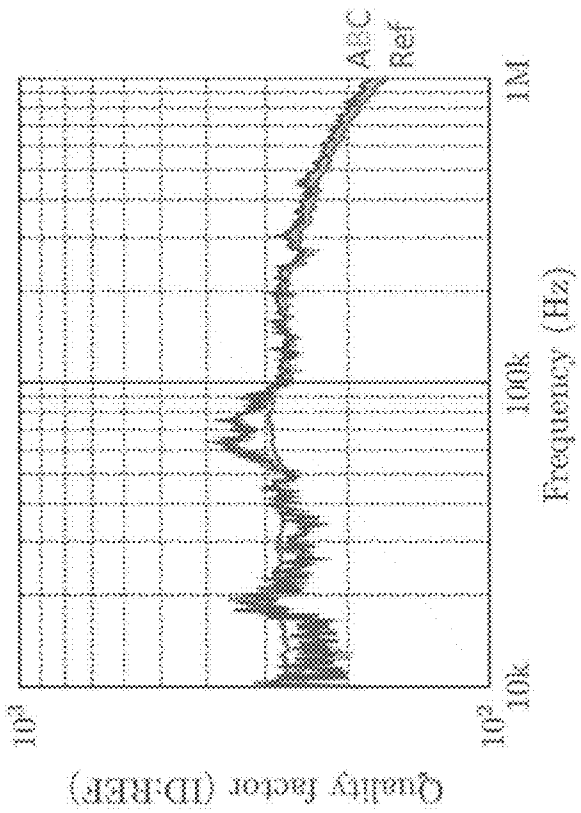
FIG. 16B illustrates quality factor of randomly oriented Sendust-flake-PDMS composite.
Figure 16A:
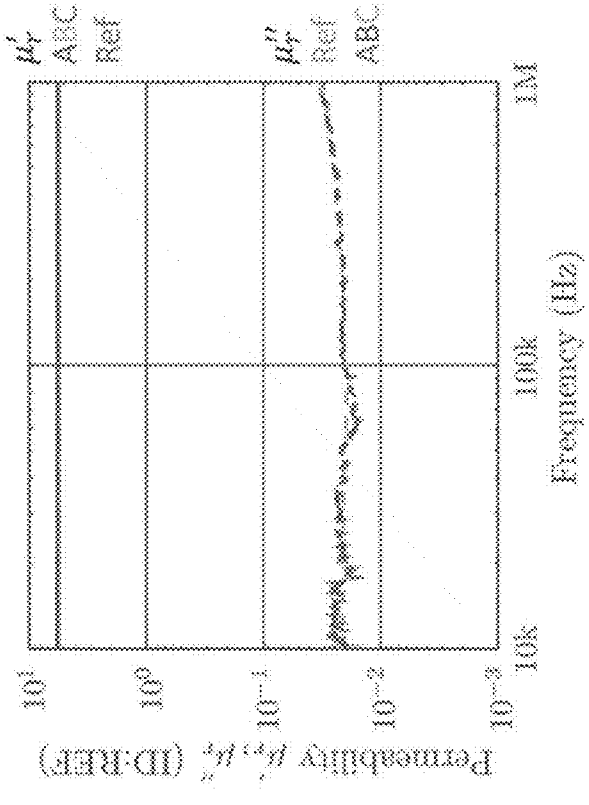
FIG. 16A illustrates permeability of randomly oriented Sendust-flake-polydimethylsiloxane (PDMS) composite.

FIG. 16A shows the real, $\mu_r'$, and the imaginary, $\mu_r''$, parts of the permeability, and FIG. 16B the quality factor, Q, values obtained as a function of frequency from 10 kHz to 1 MHz for the Sendust-PDMS composite, in which the magnetic flakes are randomly oriented. The "Ref" traces are measurements of the toroid, and the "A", "B", and "C" traces are measurements of the cubic reference core, illustrating the isotropy of the samples.

Figure 17B:
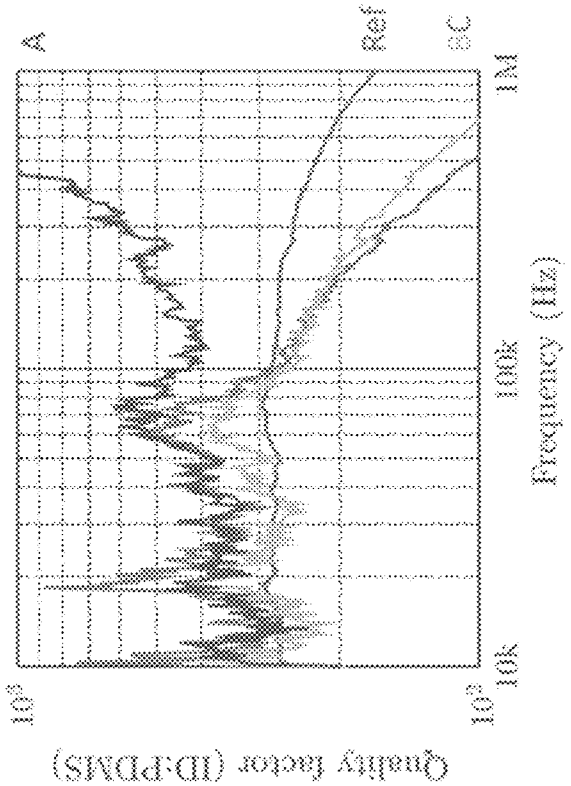
FIG. 17B illustrates quality factor of magnetically-aligned Sendust-flake-PDMS composite.
Figure 17A:
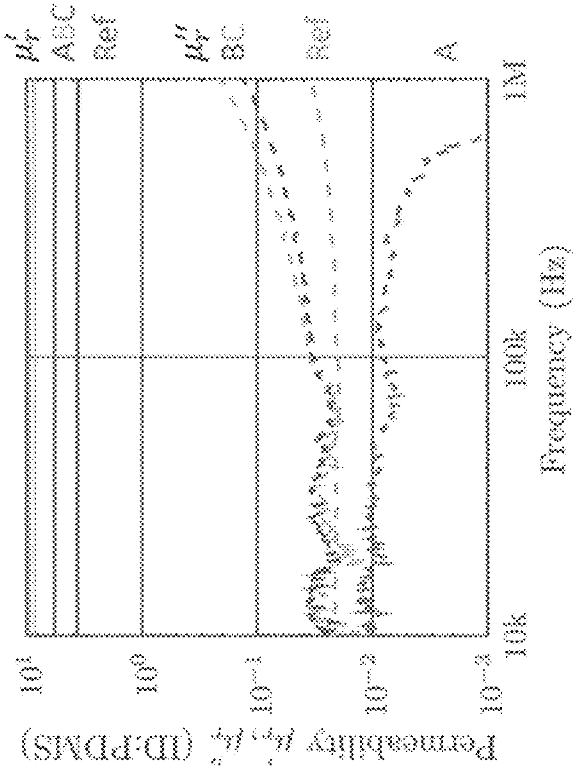
FIG. 17A illustrates permeability of magnetically-aligned Sendust-flake-PDMS composite.
Figure 18B:
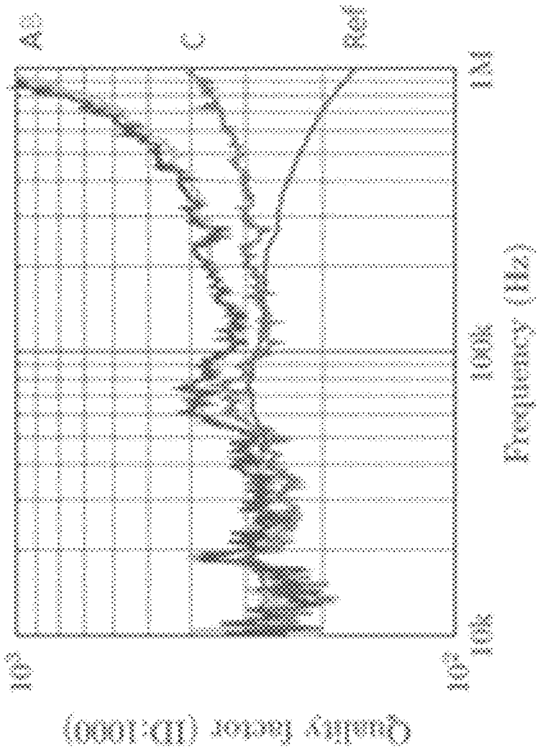
FIG. 18B illustrates quality factor of Sendust-flake composite freeze cast without B-field.
Figure 18A:
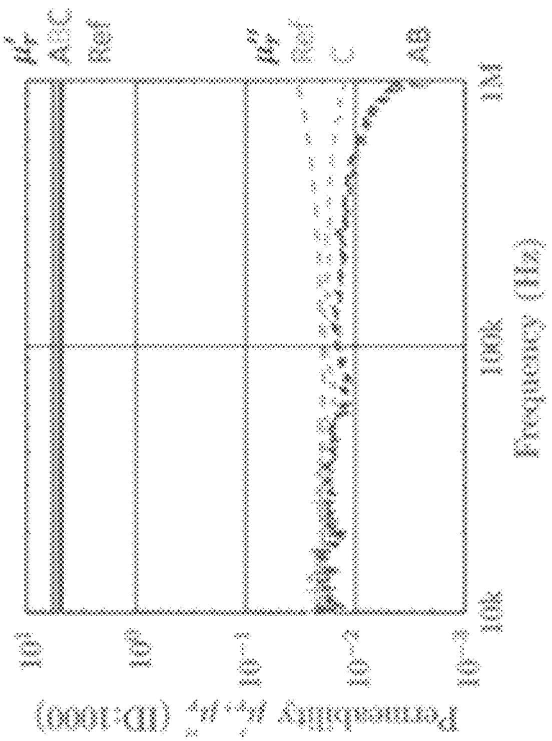
FIG. 18A illustrates permeability of Sendust-flake composite freeze cast without B-field.
Figure 19B:
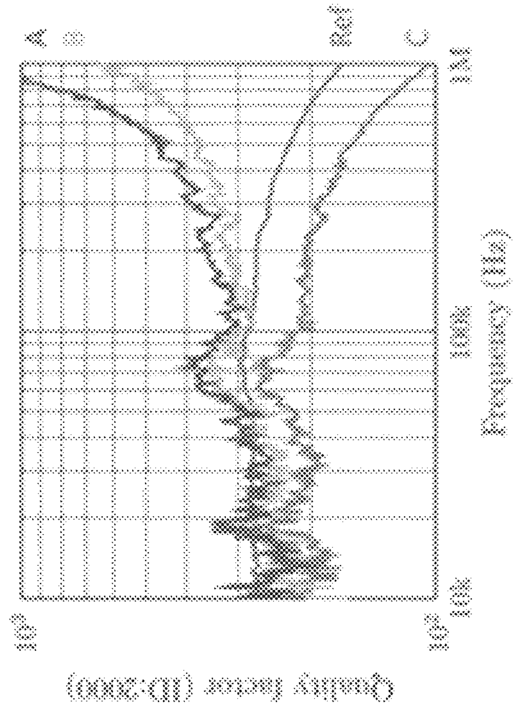
FIG. 19B illustrates quality factor of Sendust-flake composite freeze cast in B-field.
Figure 19A:
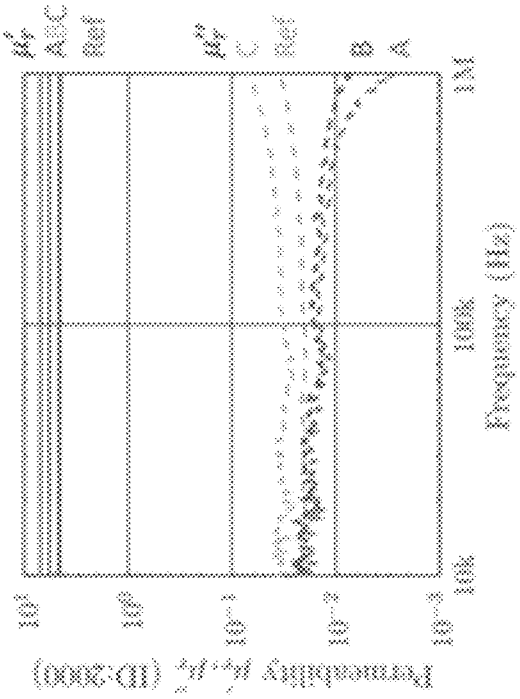
FIG. 19A illustrates permeability of Sendust-flake composite freeze cast in B-field.

For comparison, FIG. 17A and FIG. 17B show the results obtained for the Sendust-PDMS composite, in which the B-field was applied and the magnetic flakes are aligned parallel to the direction marked as "A"; they reveal that the permeabilities in the B and C directions increase, while that in the A direction decreases.

The results for the freeze-cast magnetic composites are shown in FIG. 18A and FIG. 18B and FIG. 19A and FIG. 19B. The real part of permeability stayed within a range of 4-6 for samples freeze cast without B-field and within a range of 4-7 for samples freeze cast with an applied B-field. For both sample types the quality factor improved with respect to the reference sample in at least two directions.

Example 2.14. Structural Characterization: Alignment of Cell Wall and Magnetic Flakes The structural analysis by SEM, FIB, and X-ray microtomography revealed that in the samples frozen without a magnetic field, the Sendust flakes self-assemble into a nacre-like cell wall structure similar to the one observed for alumina flakes. In the absence of forces other than those of the shear flow between the ice dendrites, a multi-domain structure typical for freeze-cast materials results, with only a comparatively weak preferential alignment along the freezing direction (FIG. 12B).

An observation is that the magnetic field also counteracted gravitational forces, reduced effects of sedimentation of the flakes and maintained their homogeneous distribution in the slurry. This effect became particularly obvious in the top part of the sample, which protrude out of the uniform B-field section of the mold; in this region, the magnetic flakes were pulled down into the B-field, leaving behind a flake-depleted slurry that resulted in a predominantly polymeric scaffold section (FIG. 14A and FIG. 14B).

Example 2.15. Mechanical Properties and Performance

Compression tests were performed, not only to determine the mechanical properties of the magnetic composites, but also to analyze the progression of failure and mode of compaction, which is of importance for possible applications such as inductor or transformer cores. The stress-strain curves of FIG. 15A, FIG. 15B, and FIG. 15C illustrate that the freeze-cast magnetic composites behave like a typical cellular solid. The significant differences in mechanical properties and performance reflect the differences in cell wall alignment, on the one hand, and the magnetic flake alignment in the cell walls, on the other. After the initially linear region of the stress-strain curve, in which the cell walls are loaded in compression and lower than ideal property values can be explained by cell wall imperfections and misalignments, the sample yields, when strain localization causes a region to buckle. Following the yield point, damage extends through the sample, progressively folding and collapsing in a concertina-like fashion. In the case of samples compressed perpendicular to the freezing direction and parallel to the B-field (⊥FD ||BF), compaction occurs at relatively constant stress, in the other two directions the stress increases with increasing strain. Fracture of the outer sample wall occurred only in (⊥FD ||BF) samples. In the (⊥FD ⊥BF) direction, in which the cell walls and the flakes within the cell walls are initially to a larger extent than in the other directions spaced and supported by polymer cell walls and bridges, sample compaction is particularly smooth and regular.

Example 2.16. Preliminary Magnetic Performance Measurements

The three traces of the Sendust-PDMS reference sample with randomly oriented flakes are nearly identical to the toroid measurement, indicating that it is isotropic. These results obtained for the Sendust PDMS reference sample prepared in a B-field illustrate that a magnetic alignment of the Sendust flakes is possible and that the alignment results in the desired increased quality factor in one direction of flux. While this material would be well suited for use with a high permeability material in the flux return path (e.g., as a distributed gap center post), it would not perform well by itself since part of the flux path would fall within a high-loss area. In contrast, both freeze-cast sample types possessed an improved quality factor in at least two directions, indicating that these samples would perform well also without the addition of high permeability materials in the flux return path (as opposed to the magnetically aligned Sendust-PDMS composite).

Example 2.17. Conclusion

Both mechanical and magnetic property measurement results confirm that a preferential alignment of magnetic flakes during magnetic-field assisted freeze casting is observable using the Sendust flakes chosen for this Example. These results also show that the magnetic-field assisted freeze-casting process can produce a monodomain sample architecture with both significantly higher mechanical properties and a considerably higher magnetic composite core quality factor due to alignment of the flakes, on the one hand, and the cell wall, in the other. One advantage of freeze-casting over only magnetically aligning the Sendust flakes with a magnetic field is that freeze-cast samples achieve lower losses in two directions of flux excitation, allowing the material to be used without an additional high permeability flux return path.

Without further elaboration, it is believed that one skilled in the art can, using the description herein, utilize the present disclosure to its fullest extent. The embodiments described herein are to be construed as illustrative and not as constraining the remainder of the disclosure in any way whatsoever. While the embodiments have been shown and described, many variations and modifications thereof can be made by one skilled in the art without departing from the spirit and teachings of the invention. Accordingly, the scope of protection is not limited by the description set out above, but is only limited by the claims, including all equivalents of the subject matter of the claims. The disclosures of all patents, patent applications and publications cited herein are hereby incorporated herein by reference, to the extent that they provide procedural or other details consistent with and supplementary to those set forth herein.

What is claimed is:

1. A method of making a magnetic composite, said method comprising:

applying a uniform magnetic field to a mixture comprising a solvent, a binder, and at least one magnetic material in a container to cause a first uniform alignment of the at least one magnetic material in a direction of the uniform magnetic field;

directionally solidifying the solvent in the mixture to form solvent crystals, while applying the uniform magnetic field, to cause a second uniform alignment of the at least one magnetic material in a direction of solvent crystal growth; and removing the solvent crystals in the container, wherein the method results in the formation of the magnetic composite comprising a binder and the uniformly aligned at least one magnetic material.

2. The method of claim 1, wherein the uniform magnetic field is generated by a magnetic fixture associated with the container, wherein the magnetic fixture comprises:

at least two soft magnetic materials further comprising one or more permanent magnets positioned between at the least two soft magnetic materials.

3. The method of claim 2, wherein the one or more permanent magnets are coiled magnets.

4. The method of claim 1, wherein the binder further comprises at least one of an electrically insulating binder, a thermally conducting binder, and a semiconducting binder.

5. The method of claim 4, wherein the binder is a polymer or biopolymer.

6. The method of claim 5, wherein the at least one magnetic material is glued together through the polymer or biopolymer.

7. The method of claim 1, wherein the mixture further comprises at least one of a particle, a fiber, and a dispersant.

8. The method of claim 1, wherein the container comprises a square or rectangular shape.

9. The method of claim 1, wherein a directional thermal gradient is applied during solidification of the mixture.

10. The method of claim 9, wherein the container comprises a bottom portion with an inclination angle greater than or equal to 0° relative to the thermal gradient.

11. The method of claim 1, wherein the magnetic field rotates the at least one magnetic material without translating (changing the position) the at least one magnetic material.

12. The method of claim 1, wherein the applying the uniform magnetic field results in alignment of the at least one magnetic material in a first direction that is parallel to a magnetic flux generated from the applied uniform magnetic field and the solidifying step results in alignment in a second direction that is parallel to a solidification direction, wherein the second direction is perpendicular to the first direction.

13. The method of claim 1, wherein the applying the uniform magnetic field results in alignment of the at least one magnetic material in a first direction that is parallel to a magnetic flux generated from the applied uniform magnetic field and the solidifying step results in alignment in a second direction that is parallel to a solidification direction, wherein the second direction is parallel to the first direction.

14. The method of claim 1, wherein the uniform magnetic field is perpendicular to a direction of solidification.

15. The method of claim 1, wherein the solidifying is performed by at least one of a bottom-up directional freezing, top-down directional freezing, bottom-up and top-down directional freezing, or double-sided directional freezing.

16. The method of claim 1, further comprising compressing the formed magnetic composite to reduce porosity of the magnetic composite.

17. The method of claim 1, wherein 60% to 100% of the at least one magnetic material in the composite is aligned in the same direction in relation to each other.

18. The method of claim 1, wherein the at least one magnetic material is a magnetic plate, magnetic flake, magnetic platelet or any combination thereof.

19. The method of claim 1, wherein the removing the solvent crystals is by sublimation.

20. A method of making a magnetic composite, the method comprising:

applying a uniform magnetic field to a mixture of water, an electrically insulating binder, and magnetic flakes in a container to cause a first uniform alignment of the magnetic flakes in a direction of the uniform magnetic field;

directionally freezing the water in the mixture using a directional thermal gradient to form ice crystals, while applying the uniform magnetic field to the mixture, to cause a second uniform alignment of the magnetic flakes in a direction of the ice crystal growth by the thermal gradient when the magnetic field is removed; and subliming the ice crystals in the container, wherein the method results in the formation of the magnetic composite comprising the electrically insulating binder and uniformly aligned magnetic flakes.

* * * * *